United States Patent
Hayashi et al.

(10) Patent No.: US 10,368,003 B2
(45) Date of Patent: Jul. 30, 2019

(54) IMAGING DEVICE AND TIME-LAPSE IMAGING METHOD

(71) Applicant: FUJIFILM Corporation, Tokyo (JP)

(72) Inventors: Daisuke Hayashi, Saitama (JP); Mikio Watanabe, Saitama (JP); Tatsuya Fujinami, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 437 days.

(21) Appl. No.: 15/160,499

(22) Filed: May 20, 2016

(65) Prior Publication Data

US 2016/0269648 A1 Sep. 15, 2016

Related U.S. Application Data

(63) Continuation of application No. PCT/JP2014/081372, filed on Nov. 27, 2014.

(30) Foreign Application Priority Data

Dec. 27, 2013 (JP) .................................. 2013-272267

(51) Int. Cl.
*H04N 5/232* (2006.01)
*G03B 17/38* (2006.01)
(Continued)

(52) U.S. Cl.
CPC ....... *H04N 5/23296* (2013.01); *G02B 21/367* (2013.01); *G02B 21/368* (2013.01);
(Continued)

(58) Field of Classification Search
CPC ........................... H04N 5/232; H04N 5/23206
(Continued)

(56) References Cited

U.S. PATENT DOCUMENTS 7,154,538 B1 * 12/2006 Fukasawa .............. H04M 11/04
348/211.3
2004/0183921 A1 9/2004 Ueda
(Continued)

FOREIGN PATENT DOCUMENTS

JP 8-178180 A 7/1996
JP 2004-233664 A 8/2004
(Continued)

OTHER PUBLICATIONS

International Search Report for PCT/JP2014/081372 (PCT/ISA/210) dated Mar. 10, 2015.
Written Opinion of the International Searching Authority for PCT/JP2014/081372 (PCT/ISA/237) dated Mar. 10, 2015.

*Primary Examiner* — Anthony J Daniels
(74) *Attorney, Agent, or Firm* — Birch, Stewart, Kolasch & Birch, LLP

(57) ABSTRACT

The present invention provides an imaging device and a time-lapse imaging method capable of simply realizing time-lapse imaging using a pan and tilt mechanism. In a preferred aspect of the present invention, an imaging device includes a pan and tilt mechanism that rotates an imaging unit in a horizontal direction and a vertical direction relative to a device body, transmits a live view image to a smartphone, displays the live view image on a display and input unit, and receives an instruction input for specifying camerawork in time-lapse imaging using the display and input unit. Accordingly, the instruction input for specifying camerawork for performing time-lapse imaging using the pan and tilt mechanism can be simply input. The imaging device controls at least the pan and tilt mechanism based on the instruction input for specifying camerawork and controls the imaging unit to perform time-lapse imaging.

12 Claims, 14 Drawing Sheets

(51) Int. Cl.
  *G03B 17/56* (2006.01)
  *G02B 21/36* (2006.01)
  *H04N 1/00* (2006.01)
  *H04N 5/235* (2006.01)
  *H04N 5/91* (2006.01)
  *H04N 5/77* (2006.01)
  *H04N 5/783* (2006.01)

(52) U.S. Cl.
  CPC ........... *G03B 17/38* (2013.01); *G03B 17/561* (2013.01); *H04N 1/00103* (2013.01); *H04N 5/2353* (2013.01); *H04N 5/23203* (2013.01); *H04N 5/23216* (2013.01); *H04N 5/23293* (2013.01); *H04N 5/77* (2013.01); *H04N 5/783* (2013.01); *H04N 5/91* (2013.01); *G03B 2206/00* (2013.01)

(58) Field of Classification Search
  USPC ......... 348/211.99, 211.2–211.4, 211.7–211.9
  See application file for complete search history.

(56) References Cited

U.S. PATENT DOCUMENTS

| | | | |
|---|---|---|---|
| 2005/0068614 A1 | 3/2005 | Yoneyama et al. | |
| 2007/0058054 A1 | 3/2007 | Kagayama et al. | |
| 2011/0249146 A1 | 10/2011 | Ishida | |
| 2012/0288269 A1* | 11/2012 | Jensen | F16M 11/14 396/428 |
| 2013/0229569 A1* | 9/2013 | Bevirt | F16M 11/12 348/373 |
| 2015/0049217 A1* | 2/2015 | Takahashi | H04N 5/2621 348/231.99 |

FOREIGN PATENT DOCUMENTS

| | | |
|---|---|---|
| JP | 2008-52227 A | 3/2008 |
| JP | 2011-223292 A | 11/2011 |
| JP | 2011-237818 A | 11/2011 |
| JP | 2012-19285 A | 1/2012 |
| JP | 2012-190033 A | 10/2012 |

* cited by examiner

FIG. 1
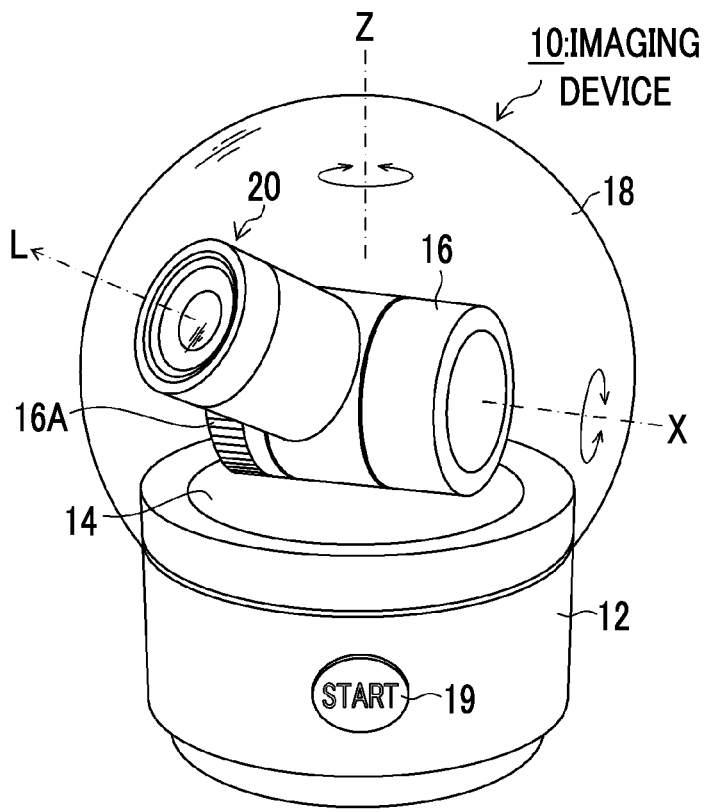
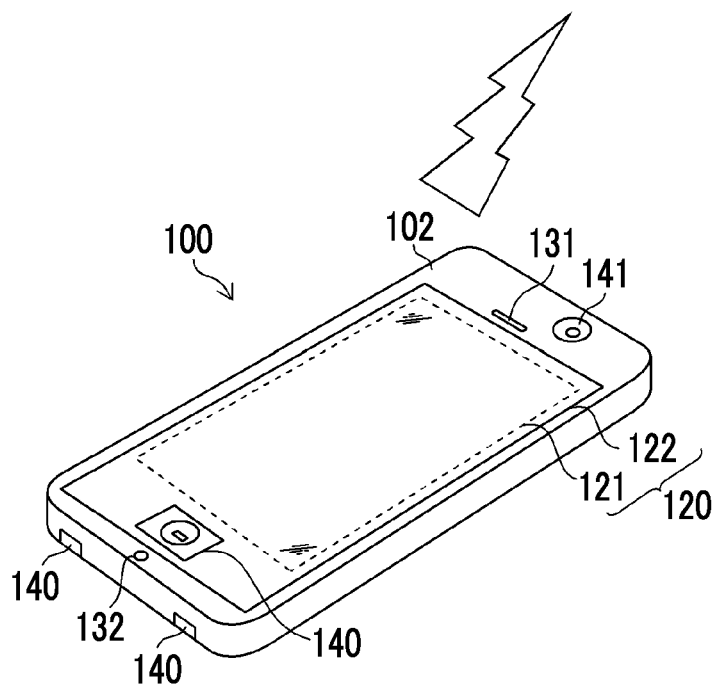

FIG. 15
(a)
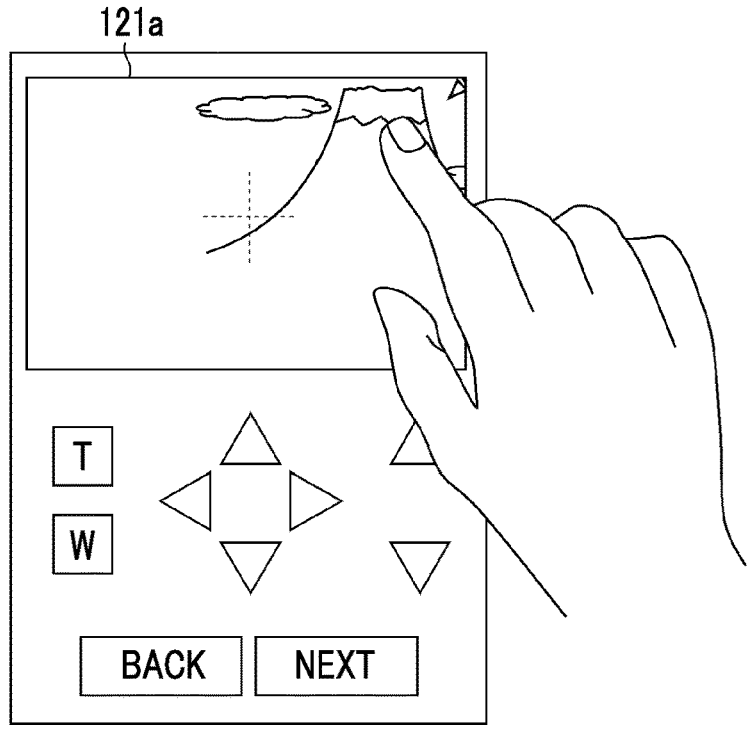
(b)
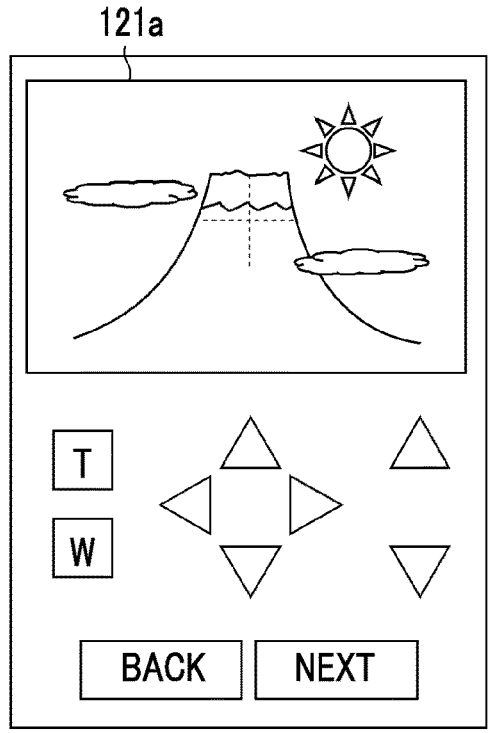

IMAGING DEVICE AND TIME-LAPSE IMAGING METHOD

CROSS-REFERENCE TO RELATED APPLICATIONS

This application is a Continuation of PCT International Application No. PCT/JP2014/081372 filed on Nov. 27, 2014, which claims priority under 35 U.S.C. § 119(a) to Japanese Patent Application No. 2013-272267 filed on Dec. 27, 2013. Each of the above applications is hereby expressly incorporated by reference, in their entirety, into the present application.

BACKGROUND OF THE INVENTION

1. Field of the Invention

The present invention relates to an imaging device and a time-lapse imaging method and, particularly, to time-lapse imaging using an imaging device comprising a pan and tilt mechanism.

2. Description of the Related Art

Conventionally, an imaging device capable of capturing still images at certain imaging intervals (time-lapse imaging), connecting a plurality of captured still images, and recording the connected still images as a time-lapse video is known. Accordingly, a time-lapse video in which changes in a subject over a long period of time, such as a flow of clouds or flowering of a flower, are compressed into a short time can be enjoyed.

Further, an imaging device having a time-lapse imaging function is also applied to an image acquisition device for a microscope that images temporal changes in living cells (JP2004-233664A and JP2011-237818A).

In a case in which temporal changes in living cells are imaged by an image acquisition device for a microscope, fluorescence imaging is generally used, but in this fluorescence imaging, long time exposure in which an exposure time is from a few seconds to tens of seconds may be performed in order to image a very low luminance subject.

Therefore, contradiction may occur in that the exposure time becomes longer than an imaging interval designated by an operator, whereas, in a case in which a time obtained by adding the exposure time to the imaging interval designated by the operator is used as an actual imaging interval, there are problems in that the actual imaging interval may be significantly different from an imaging interval intended by the operator, and subject imaging as desired by the operator cannot be performed.

A microscopic image acquisition device comprising a time-lapse imaging function described in JP2004-233664A is characterized in that the microscopic image acquisition device determines contradiction of time-lapse imaging conditions in a case in which settings regarding imaging such as an exposure time, an imaging interval, and the number of captured images are performed by the operator, and presents the contradiction of the time-lapse imaging conditions based on a result of the determination.

Further, the microscope system has a shallow focal depth. Accordingly, in a case in which an observation sample (a sample having a nucleus sealed with a glass slide and a cover glass) is placed on a stage, and observation of the nucleus is performed, there is a problem in that a motion of the nucleus cannot be observed for a long time if the nucleus is moved above a focus depth area or a focal position of an objective lens is shifted with a change in ambient temperature.

In the microscope system described in JP2011-237818A, an observer is allowed to register a center position of an imaging area, an imaging area (an upper limit of the imaging area and a lower limit of the imaging area) based on the center position of the imaging area, an interval (Z interval) at which a stage is moved in an optical axis direction (Z axis direction), the number of captured images, a time-lapse interval, and an imaging time using a display unit that displays a sample image, an operation display unit regarding control of a microscope, and a display unit that sets imaging conditions of the sample image. If imaging is started after the registration, the microscope system performs imaging of the sample while moving the stage in the optical axis direction (Z axis direction) at the set Z interval from the upper limit of the imaging area to the lower limit of the imaging area, and repeatedly performs this imaging until the imaging time ends, at set time-lapse intervals.

Further, in JP2011-237818A, it is described that, in order to image a plurality of observed bodies (nucleus) within a sample, the observer moves the stage in X and Y directions perpendicular to the optical axis direction through a button operation, determines the plurality of observed bodies on which time-lapse observation is performed, moves the stage at Z intervals in a Z direction, and images the nucleus, and also moves the stage in the X and Y-direction and performs imaging of the plurality of observed bodies.

Meanwhile, there is an imaging device (surveillance camera system) comprising a pan and tilt mechanism, which is a system for performing surveillance while cyclically moving to registered preset positions (specific imaging positions) when pan and tilt positions, a zoom magnification, or the like is registered for preset positions (JP2012-19285A).

SUMMARY OF THE INVENTION

In JP2004-233664A, it is described that the operator sets time-lapse imaging conditions such as the exposure time, the imaging interval, and the number of captured images. However, since an invention described in JP2004-233664A is an image acquisition device for a microscope and does not comprise a pan and tilt mechanism, setting an imaging direction (azimuth) of an imaging unit is not described.

Further, in JP2011-237818A, it is also described that the observer registers, for example, the number of captured images, the time-lapse interval, and the imaging time. In particular, it is described that a position of the stage (position in X and Y directions in a direction perpendicular to an observation optical axis) is determined, the stage is moved in the X and Y directions according to the position of the observed bodies, and imaging is performed so as to image a plurality of observed bodies on the stage through time-lapse imaging. However, since an invention described in JP2011-237818A is a microscope system and does not comprise a pan and tilt mechanism, setting an imaging direction (azimuth) of an imaging unit is not described.

Meanwhile, registration of pan and tilt positions in each preset position is described in JP2012-19285A. However, since the imaging device described in JP2012-19285A is applied to a surveillance camera system, but does not perform time-lapse imaging, a relationship between the registered pan and tilt positions and the time-lapse imaging is not described.

The present invention has been made in view of such circumstances, and an object thereof is to provide an imaging device and a time-lapse imaging method capable of simply realizing time-lapse imaging using a pan and tilt mechanism.

In order to achieve the above object, an imaging device according to an aspect of the present invention comprises: an imaging unit including an imaging lens and an imaging element; a pan and tilt mechanism that rotates the imaging unit in a horizontal direction and a vertical direction relative to a device body; a live view image output unit that outputs a live view image captured by the imaging unit to a display unit; a first input unit that receives an instruction input for operating the pan and tilt mechanism through a manual operation; a second input unit that receives an instruction input performed using the live view image displayed on the display unit and the first input unit, the instruction input being an instruction input for specifying camerawork in time-lapse imaging in which still images are captured at certain imaging intervals; a third input unit that receives an instruction input for start of the time-lapse imaging; and a control unit that controls at least the pan and tilt mechanism and controls the imaging unit to perform the time-lapse imaging based on the instruction input for specifying the camerawork when the control unit receives the instruction input for specifying the camerawork from the second input unit and then receives the instruction input for start of time-lapse imaging from the third input unit.

A photographer can operate the pan and tilt mechanism through an instruction input that is input via the first input unit through a manual operation while viewing the live view image displayed on the display unit, and accordingly, can match the imaging unit with a subject in a desired imaging direction (azimuth) (adjust the pan and tilt angles of the imaging unit). Then, the photographer can input the instruction input for specifying the camerawork in time-lapse imaging including the imaging direction of the imaging unit from the second input unit, using the live view image displayed on the display unit and the first input unit. That is, it is possible to simply input the instruction input for specifying the camerawork for performing time-lapse imaging using the pan and tilt mechanism.

Thereafter, if the instruction input for start of the time-lapse imaging is performed from the third input unit, the control unit controls at least the pan and tilt mechanism based on the instruction input for specifying the camerawork, which is input in advance, and controls the imaging unit to perform the time-lapse imaging. Accordingly, it is possible to automatically perform the time-lapse imaging while panning and tilting the imaging unit. The instruction input for start of the time-lapse imaging includes an input of a start time of the time-lapse imaging. In this case, the time-lapse imaging may automatically start in a case in which the start time of the time-lapse imaging arrives.

The imaging device according to another aspect of the present invention may further comprise angle detection units that detect pan and tilt angles of the imaging unit, respectively, and the second input unit may receive the pan and tilt angles detected by the angle detection units at the time of setting the imaging direction of each image, as an instruction input for specifying the camerawork, when two or more images of which the imaging directions are different are set, the instruction input being performed using the live view image displayed on the display unit and the first input unit. Accordingly, it is possible to input the pan and tilt angles when two or more images of which the imaging directions are different are captured, as the instruction input for specifying the camerawork.

In the imaging device according to yet another aspect of the present invention, it is preferable that the two or more images include a start image and an end image of time-lapse imaging, the second input unit receives the number or the playback time of still images captured through time-lapse imaging, and an imaging period of time-lapse imaging as an instruction input for specifying the camerawork, and the control unit calculates an imaging interval of a plurality of still images captured through time-lapse imaging and a change in the pan and tilt angles between the still images based on the respective pan and tilt angles of a start image and an end image of the time-lapse imaging, the received number of captured still images, or the number of captured still images corresponding to the playback time, and the received imaging period of time-lapse imaging, and controls the pan and tilt mechanism and the imaging unit based on the calculated imaging interval and the calculated change in the pan and tilt angles.

The pan and tilt angles of the start image and the end image of time-lapse imaging are input as an instruction input for specifying the camerawork, and also the number or the playback time of the still images captured through time-lapse imaging, and the imaging period of time-lapse imaging are input as an instruction input for specifying the camerawork. The control unit can calculate the change in the pan and tilt angles between the still images captured through time-lapse imaging by dividing the amount of change in the pan and tilt angles of the start image and the end image by the number of still images captured through time-lapse imaging or the number of captured images corresponding to the playback time (playback time (seconds)×the number of frames per second), and can calculate the imaging interval of still images captured through time-lapse imaging by dividing the imaging period of time-lapse imaging by the number of captured still images. The control unit controls the pan and tilt mechanism and the imaging unit based on the change in the pan and tilt angles calculated in this way and the imaging interval. Accordingly, it is possible to capture a plurality of still images in which the pan and tilt angles are changed by the same angle from the start image to the end image of time-lapse imaging, and to perform variegated time-lapse imaging, as compared with time-lapse imaging in which the imaging is performed in a fixed direction.

In the imaging device according to yet another aspect of the present invention, it is preferable that the two or more images include a start image and an end image of time-lapse imaging, the second input unit receives the number or a playback time of the still images captured through time-lapse imaging, and the imaging interval of time-lapse imaging as an instruction input for specifying the camerawork, and the control unit calculates a change in the pan and tilt angles between the still images captured through time-lapse imaging based on the respective pan and tilt angles of the start image and the end image of the time-lapse imaging, and the received number of captured still images or the number of captured still images corresponding to the playback time, and controls the pan and tilt mechanism and the imaging unit based on the received imaging interval and the calculated change in the pan and tilt angles.

According to yet another aspect of the present invention, this aspect is different from the above aspect in that the imaging interval of time-lapse imaging is input in place of the imaging period of time-lapse imaging. Accordingly, it is possible to control the pan and tilt mechanism and the imaging unit based on the calculated change in the pan and tilt angles and the received imaging interval, similar to the above. Since the number of captured still images can be directly input or converted from the playback time, it is possible to calculate the imaging period by multiplying the number of captured images by the imaging interval and to present the imaging period to a photographer.

In the imaging device according to yet another aspect of the present invention, it is preferable that the two or more images include a start image and an end image of time-lapse imaging, the second input unit receives the imaging period and the imaging interval of time-lapse imaging as an instruction input for specifying the camerawork, and the control unit calculates a change in the pan and tilt angles between the still images captured through time-lapse imaging based on the respective pan and tilt angles of the start image and the end image of the time-lapse imaging, and the number of captured still images that are captured through time-lapse imaging calculated from the received imaging period and the received imaging interval of the time-lapse imaging, and controls the pan and tilt mechanism and the imaging unit based on the received imaging interval and the calculated change in the pan and tilt angles.

According to yet another aspect of the present invention, this aspect is different from the above aspect in that the imaging period of time-lapse imaging is input in place of the number of still images captured through time-lapse imaging or the playback time of the still images. The control unit can calculate the number of captured still images by dividing the imaging period of time-lapse imaging by the imaging interval and can calculate the change in the pan and tilt angles between the still images captured through time-lapse imaging by dividing an angle of a difference of the pan angle or the tilt angle between the start image and the end image of time-lapse imaging by the calculated number of captured still images. The control unit can control the pan and tilt mechanism and the imaging unit based on the change in the pan angle or the tilt angle between the still images calculated as described above and the input imaging interval of the time-lapse imaging.

In the imaging device according to yet another aspect of the present invention, it is preferable that the two or more images include a start image and an end image of time-lapse imaging, the second input unit receives the imaging period of time-lapse imaging, and a change in a pan angle or a tilt angle between the still images captured through time-lapse imaging as an instruction input for specifying the camerawork, and the control unit calculates an imaging interval of a plurality of still images captured through time-lapse imaging based on the respective pan and tilt angles of the start image and the end image of the time-lapse imaging, and the received imaging period of time-lapse imaging and the change in the pan angle or the tilt angle, and controls the pan and tilt mechanism and the imaging unit based on the calculated imaging interval and the received change in the pan angle or the tilt angle.

According to yet another aspect of the present invention, this aspect is different from the above aspects in that the change in the pan angle or the tilt angle between the still images is input in place of the imaging interval of time-lapse imaging. The control unit can calculate the number of captured still images by dividing an angle of a difference of the pan angle or the tilt angle between the start image and the end image of time-lapse imaging by the change in the pan angle or the tilt angle, and can calculate the imaging interval of the time-lapse imaging by dividing the imaging period of time-lapse imaging by the calculated number of captured still images. The control unit can control the pan and tilt mechanism and the imaging unit based on the input change in the pan angle or the tilt angle between the still images and the calculated imaging interval of the time-lapse imaging.

It is preferable that the imaging device according to yet another aspect of the present invention further comprises a recording image generation unit that generates an image for recording obtained by connecting a plurality of still images captured through time-lapse imaging. As the image for recording, a time-lapse video conforming to a video recording format or an image conforming to a multi-picture format is considered.

It is preferable that the imaging device according to yet another aspect of the present invention further comprises a recording image generation unit that generates an image for recording obtained by connecting a plurality of still images captured through time-lapse imaging, the second input unit receives the number or a playback time of the still images captured through time-lapse imaging in one imaging direction and an imaging period of time-lapse imaging as an instruction input for specifying the camerawork, the control unit calculates an imaging interval of a plurality of still images captured through time-lapse imaging based on the received number of captured still images or the number of captured still images corresponding to the playback time, and the received imaging period of time-lapse imaging, and controls the pan and tilt mechanism and the imaging unit based on the pan and tilt angles of two or more images of which the imaging directions are different, the received number of captured still images or the number of captured still images corresponding to the playback time, and the calculated imaging interval of the time-lapse imaging, and the recording image generation unit connects the still images in time series of which the imaging directions are the same among the plurality of still images captured through time-lapse imaging, and generates a plurality of images for recording of which the imaging directions are different.

According to yet another aspect of the present invention, if the number or the playback time of captured still images that are captured through time-lapse imaging in one imaging direction is input, it is possible to calculate a total number of captured images or a total playback time by multiplying the number of captured images or the playback time by the number of images of which the imaging directions are different. The control unit can calculate the imaging interval of the time-lapse imaging by dividing the imaging period of time-lapse imaging by a total number of captured images or the number of captured images corresponding to the total playback time. The control unit can perform time-lapse imaging on a plurality of subjects of which the imaging directions are different by sequentially controlling the pan and tilt mechanism (cyclic control) to perform imaging using the imaging unit based on the pan and tilt angles of two or more images of which the imaging directions are different, and the calculated imaging interval of time-lapse imaging. It is possible to generate a plurality of images for recording of which the imaging directions are different by connecting the still images in time series of which the imaging directions are the same among the plurality of still images captured through time-lapse imaging. That is, by effectively utilizing the pan and tilt mechanism, it is possible to simultaneously generate a plurality of images for recording of which the imaging directions are different (time-lapse images).

It is preferable that the imaging device according to yet another aspect of the present invention further comprises a recording image generation unit that generates an image for recording obtained by connecting a plurality of still images captured through time-lapse imaging, the second input unit receives the number or a playback time of the still images captured through time-lapse imaging in one imaging direction and an imaging period of time-lapse imaging as an instruction input for specifying the camerawork, the control unit controls the pan and tilt mechanism and the imaging unit based on the pan and tilt angles of two or more images of which the imaging directions are different, the received number of captured images or the number of captured still images corresponding to the playback time, and the received imaging interval of time-lapse imaging, and the recording image generation unit connects the still images in time series of which the imaging directions are the same among the plurality of still images captured through time-lapse imaging, and generates a plurality of images for recording of which the imaging directions are different.

According to yet another aspect of the present invention, this aspect is different from the above aspect in that the imaging interval of time-lapse imaging is input in place of the imaging period of time-lapse imaging. The control unit can perform time-lapse imaging on a plurality of subjects of which the imaging directions are different by sequentially controlling the pan and tilt mechanism (cyclic control) to perform imaging using the imaging unit based on the pan and tilt angles of two or more images of which the imaging directions are different, the input number of captured images or the number of captured still images corresponding to the playback time, and the imaging interval of time-lapse imaging.

It is preferable that the imaging device according to yet another aspect of the present invention further comprises a recording image generation unit that generates an image for recording obtained by connecting a plurality of still images captured through time-lapse imaging, the second input unit receives the imaging period and the imaging interval of time-lapse imaging as an instruction input for specifying the camerawork, the control unit controls the pan and tilt mechanism and the imaging unit based on the pan and tilt angles of two or more images of which the imaging directions are different, and the received imaging period and the received imaging interval of time-lapse imaging, and the recording image generation unit connects the still images in time series of which the imaging directions are the same among the plurality of still images captured through time-lapse imaging, and generates a plurality of images for recording of which the imaging directions are different.

According to yet another aspect of the present invention, this aspect is different from the above aspects in that the imaging period of time-lapse imaging is input in place of the number of captured images or the playback time of the still image captured through time-lapse imaging in one imaging direction. The control unit can calculate the number of captured still images by dividing the imaging period of time-lapse imaging by the imaging interval of the time-lapse imaging, and can perform time-lapse imaging on a plurality of subjects of which the imaging directions are different by sequentially controlling the pan and tilt mechanism (cyclic control) to perform imaging using the imaging unit based on the pan and tilt angles of two or more images of which the imaging directions are different, the calculated number of the captured still images, and the imaging interval of time-lapse imaging.

In the imaging device according to yet another aspect of the present invention, it is preferable that the imaging lens is a zoom lens, the first input unit receives an instruction input for operating the zoom lens, and when two or more images of which the imaging directions are different are set, the second input unit receives a zoom magnification of the zoom lens at the time of setting the imaging direction of each image, as an instruction input for specifying the camerawork. Accordingly, it is possible to change the zoom magnification of the still image captured through time-lapse imaging.

The imaging device according to yet another aspect of the present invention further comprises a communication unit that wirelessly communicates with an external terminal, and the communication unit functions as the live view image output unit, the first input unit, the second input unit, and the third input unit. Accordingly, by operating an external terminal in a state in which the imaging device is installed in a desired position, an instruction input for operating the pan and tilt mechanism, an instruction input for specifying the camerawork, and an instruction input for start of time-lapse imaging can be given to the imaging device.

It is preferable that the imaging device according to yet another aspect of the present invention further comprises a communication unit that wirelessly communicates with an external terminal, and the communication unit transmits the image for recording generated by the recording image generation unit to the terminal. Accordingly, a storage unit for storing the image for recording becomes unnecessary in the imaging device, and the imaging device can be made at low cost.

The imaging device according to yet another aspect of the present invention has a time-lapse imaging mode for performing the time-lapse imaging, a still image capturing mode, and a video imaging mode, the communication unit receives a selection instruction for the time-lapse imaging mode, the still image capturing mode, or the video imaging mode, and an imaging instruction in the still image capturing mode or the video imaging mode from the terminal, and the control unit performs switching to the still image capturing mode or the video imaging mode when the control unit receives the selection instruction for the still image capturing mode or the video imaging mode via the communication unit, and controls the imaging unit to capture a still image or a video when the control unit receives the imaging instruction in the still image capturing mode or the video imaging mode. Accordingly, normal still image or video imaging other than the time-lapse imaging can also be performed and, particularly, still image or video imaging can be performed by operating an external terminal to operate the pan and tilt mechanism. Therefore, self-imaging is performed.

It is preferable that the imaging device according to yet another aspect of the present invention further comprises a fourth input unit that receives an instruction input for a preview display, and the control unit controls at least the pan and tilt mechanism based on the instruction input for specifying the camerawork and displays a live view image on the display unit when the control unit receives the instruction input for a preview display from the fourth input unit. Accordingly, it is possible to preview an image (image in which time is not compressed) corresponding to an image captured through time-lapse imaging and confirm at least the camerawork. For example, by controlling the pan and tilt mechanism using the angle change per time calculated by dividing the amount of a change in the pan and tilt angles of the start image and the end image by the playback time, it is possible to confirm the motion of the same image as when the image generated by the recording image generation unit is played, using the live view image.

In the imaging device according to yet another aspect of the present invention, it is preferable for the device body to include a tripod mounting unit. Accordingly, it is possible to fix the imaging device to a tripod when time-lapse imaging is performed.

The invention according to yet another aspect of the present invention is a time-lapse imaging method in an imaging device comprising an imaging unit including an imaging lens and an imaging element, and a pan and tilt mechanism that rotates the imaging unit in a horizontal direction and a vertical direction relative to a device body, the time-lapse imaging method comprising the steps of: displaying a live view image captured by the imaging unit on a display unit; receiving an instruction input for operating the pan and tilt mechanism through a manual operation; receiving an instruction input performed using the live view image displayed on the display unit and a first input unit, the instruction input being an instruction input for specifying camerawork in time-lapse imaging in which still images are captured at certain imaging intervals; and controlling at least the pan and tilt mechanism and controlling the imaging unit to perform the time-lapse imaging based on the instruction input for specifying the camerawork when the instruction input for specifying the camerawork is received and then an instruction input for start of time-lapse imaging is received.

According to the present invention, it is possible to input, through a simple operation, the camerawork for realizing the time-lapse imaging using the pan and tilt mechanism, and to simply realize the time-lapse imaging using the pan and tilt mechanism.

BRIEF DESCRIPTION OF THE DRAWINGS

FIG. 1 is a perspective view illustrating an appearance of an imaging device according to the present invention.

FIG. 15 is a diagram illustrating another user interface (UI) when a pan and tilt mechanism is manually operated by a smartphone.

DESCRIPTION OF THE PREFERRED EMBODIMENTS

Figure 2:
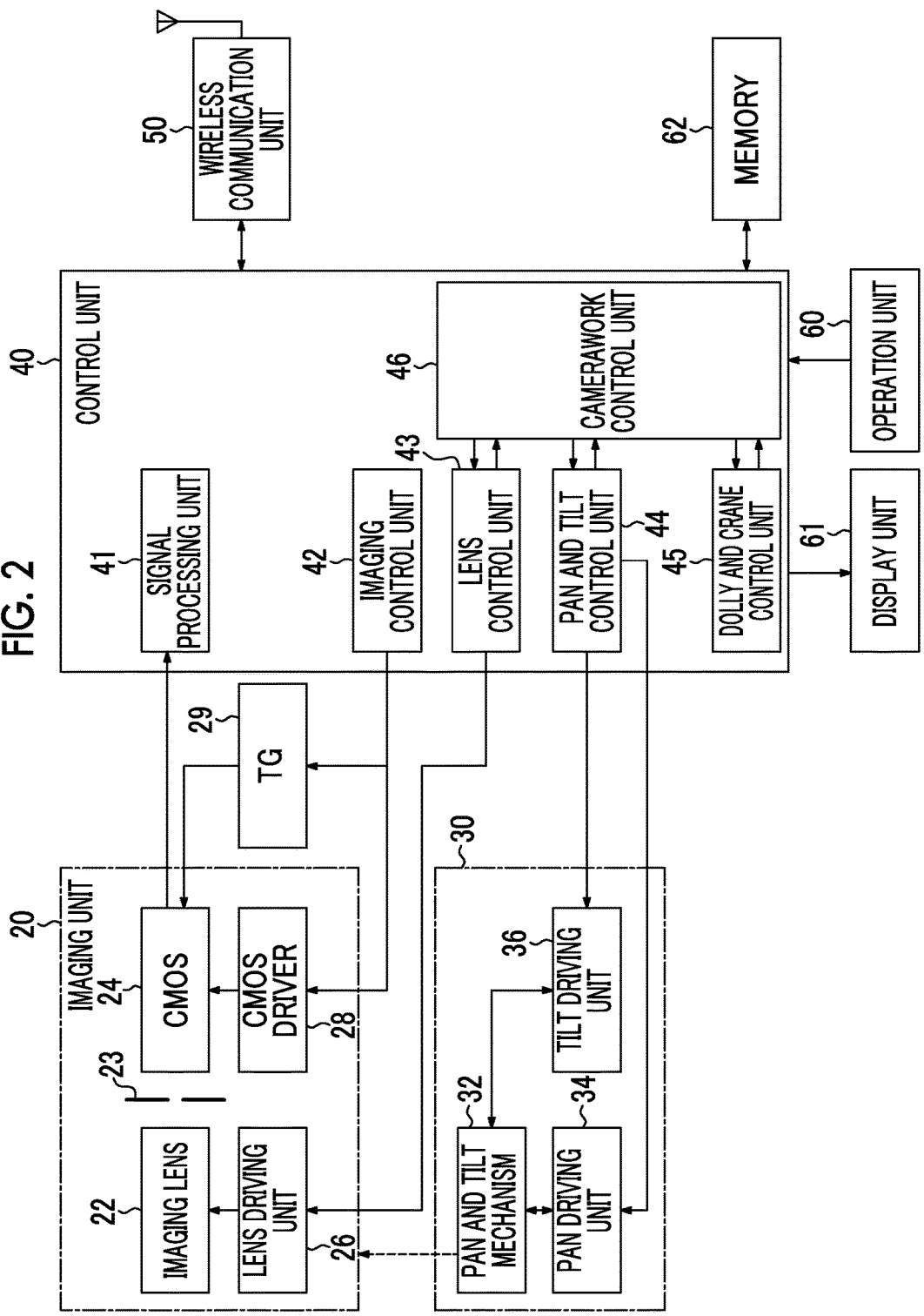
FIG. 2 is a block diagram illustrating an embodiment of an internal configuration of the imaging device.

Hereinafter, embodiments of an imaging device and a time-lapse imaging method according to the present invention will be described with reference to the accompanying drawings.

<Appearance of Imaging Device>

FIG. 1 is a perspective view illustrating an appearance of an imaging device according to the present invention.

The imaging device 10 mainly includes a device body 12, a pedestal 14, a holding unit 16 fixed to the pedestal 14 and rotatably holds an imaging unit 20, and a dome cover 18 that covers the imaging unit 20.

The pedestal 14 is disposed to be rotatable about an axis in a vertical direction Z of the device body 12, and rotates about the axis in the vertical direction Z by a pan driving unit 34 (FIG. 2).

A holding unit 16 includes a gear 16A provided on the same axis as an axis in a horizontal direction X, and rotates the imaging unit 20 in up and down directions (tilt operation) according to a driving force delivered from a tilt driving unit 36 (FIG. 2) via the gear 16A.

The dome cover 18 is a dust-proof and drip-proof cover, and has, preferably, a spherical shell shape having a constant thickness, in which an intersection between the axis in the horizontal direction X and the axis in the vertical direction Z is a center of curvature so that optical performance of the imaging unit 20 does not change regardless of an optical axis direction L of the imaging unit 20.

Further, it is preferable for a tripod mounting unit (for example, tripod screw hole; not shown) to be provided on a back surface of the device body 12.

An imaging start button 19 for instructing start of imaging, and a power switch (not illustrated) are provided in the imaging device 10, but the imaging device 10 includes a wireless communication unit 50 (FIG. 2) so that various instruction inputs for operations are applied from, mainly, an external terminal (in this example, smartphone) 100 through wireless communication with the smartphone 100.

[Internal Configuration of Imaging Device]

FIG. 2 is a block diagram illustrating an embodiment of an internal configuration of the imaging device 10.

This imaging device 10 mainly captures a still image (time-lapse imaging) at regular imaging intervals, but can perform capturing of a normal still image and a video. The imaging device 10 roughly includes the imaging unit 20, a pan and tilt device 30, a control unit 40, and a wireless communication unit 50.

The imaging unit 20 includes, for example, an imaging lens 22, and an imaging element 24. The imaging lens 22 includes a monofocal lens or a zoom lens, and causes a subject image to be formed on an imaging surface of the imaging element 24. A focus lens, a variable magnification lens (in the case of the zoom lens), and a diaphragm 23 included in the imaging lens 22 are driven by a lens driving unit 26.

The imaging element 24 in this example is a color imaging element in which primary color filters of three primary colors including red (R), green (G), and blue (B) are arranged in a predetermined pattern (for example, a Bayer array, G stripe R/G full checkered, an X-Trans (registered trademark) array, or a honeycomb arrangement) for each pixel, and includes a complementary metal oxide semiconductor (CMOS) image sensor. The imaging element 24 is not limited to the CMOS image sensor, may be a charge coupled device (CCD) image sensor.

The imaging element 24 is driven by a CMOS driver 28 including, for example, a vertical driver and a horizontal driver, and a timing generator (TG) 29. A pixel signal according to the amount of incident light of subject light (digital signal corresponding to signal charge accumulated in each pixel) is read from the imaging element 24.

The pan and tilt device 30 includes, for example, a pan mechanism that rotates the imaging unit 20 in a horizontal direction (pan direction) relative to the device body 12 and a tilt mechanism that rotates the imaging unit 20 in a vertical direction (tilt direction) (hereinafter referred to as a "pan and tilt mechanism") 32, as illustrated in FIG. 1, the pan driving unit 34, and the tilt driving unit 36. The pan and tilt mechanism 32 includes a home position sensor that detects a reference position of a rotation angle (pan angle) in the pan direction, and a home position sensor that detects a reference position of a tilt angle in the tilt direction.

Each of the pan driving unit 34 and the tilt driving unit 36 includes a stepping motor and a motor driver, and outputs a driving force to a pan and tilt mechanism 32 to drive the pan and tilt mechanism 32.

The control unit 40 mainly includes a signal processing unit 41, an imaging control unit 42, an lens control unit 43, a pan and tilt control unit 44, a dolly and crane control unit 45, and a camerawork control unit 46.

The signal processing unit 41 performs signal processing such as offset processing, a gain control process including white balance correction and sensitivity correction, a gamma correction process, demosaic processing (demosaicing processing), or an RGB/YC conversion process on a digital image signal input from the imaging unit 20. Here, the demosaic processing is a process of calculating all of color information for each pixel from a mosaic image corresponding to a color filter array of a single-plate color imaging element, and is also referred to as a synchronization process. For example, in the case of an imaging element including color filters for three colors RGB, the demosaic processing is a process of calculating color information of all of RGB for each pixel from a mosaic image including RGB. Further, the RGB/YC conversion process is a process of generating luminance data Y and chrominance data Cb and Cr from RGB image data subjected to de-mosaic processing.

The imaging control unit 42 is a unit that instructs, for example, discharge of charges accumulated in a capacitor of each pixel of the imaging element 24 or reading of a signal corresponding to the charges accumulated in the capacitor via the CMOS driver 28 and the TG 29, and performs imaging control in the time-lapse imaging or the like.

The lens control unit 43 is a unit that controls the focus lens, the variable magnification lens, and the diaphragm 23 included in the imaging lens 22 via the lens driving unit 26, and performs, for example, autofocus (AF) control to move the focus lens to a focusing position. The AF control is performed by integrating an absolute value of a high-frequency component of a digital signal corresponding to an AF area, detecting a focusing position in which the integrated value (AF evaluation value) is maximized, and moving the focus lens to the detected focusing position.

The pan and tilt control unit 44 is a unit that controls the pan and tilt device 30. The dolly and crane control unit 45 is a unit that controls a dolly device or a crane device in a case in which the imaging device 10 is mounted on the dolly device or the crane device.

The camerawork control unit 46 outputs an instruction signal for controlling the lens control unit 43, the pan and tilt control unit 44, and the dolly and crane control unit 45 in order to realize time-lapse imaging according to the present invention.

Details of content of the control in the lens control unit 43, the pan and tilt control unit 44, the dolly and crane control unit 45, and the camerawork control unit 46 at the time of time-lapse imaging will be described below.

The wireless communication unit 50 (a first input unit, a second input unit, and a third input unit) is a unit that performs wireless communication with an external terminal such as the smartphone 100 illustrated in FIG. 1, and receives various instruction inputs for operations from the smartphone 100 through wireless communication. Further, the wireless communication unit 50 can transmit, for example, an image for recording obtained by connecting a plurality of still images captured through time-lapse imaging, to the smartphone 100 and also transmit an image (live view image) captured through video imaging by the imaging unit 20 and processed by the signal processing unit 41 to the smartphone 100. Accordingly, it is possible to record the image for recording such as a time-lapse video in a recording medium inside or outside the smartphone 100 or display the live view image on the display unit of the smartphone 100.

The operation unit 60 (a first input unit, a second input unit, a third input unit, and a fourth input unit) includes, for example, an imaging start button 19 provided in the device body 12 (FIG. 1) and a power button, and can perform an instruction input for the same operation as an instruction input for an operation from the smartphone 100.

The display unit 61 functions as an image display unit that displays a live view image, a played image, or the like, and functions as a user interface (UI unit) for displaying a menu screen and setting and inputting various parameters in cooperation with an operation unit 60.

The memory 62 includes, for example, a synchronous dynamic random access memory (SDRAM) including a storage area that temporarily stores still images sequentially captured during time-lapse imaging, and a work area in which various calculation processes are performed, or a read only memory (ROM) in which, for example, a program for imaging and various data necessary for control are stored.

Figure 3:
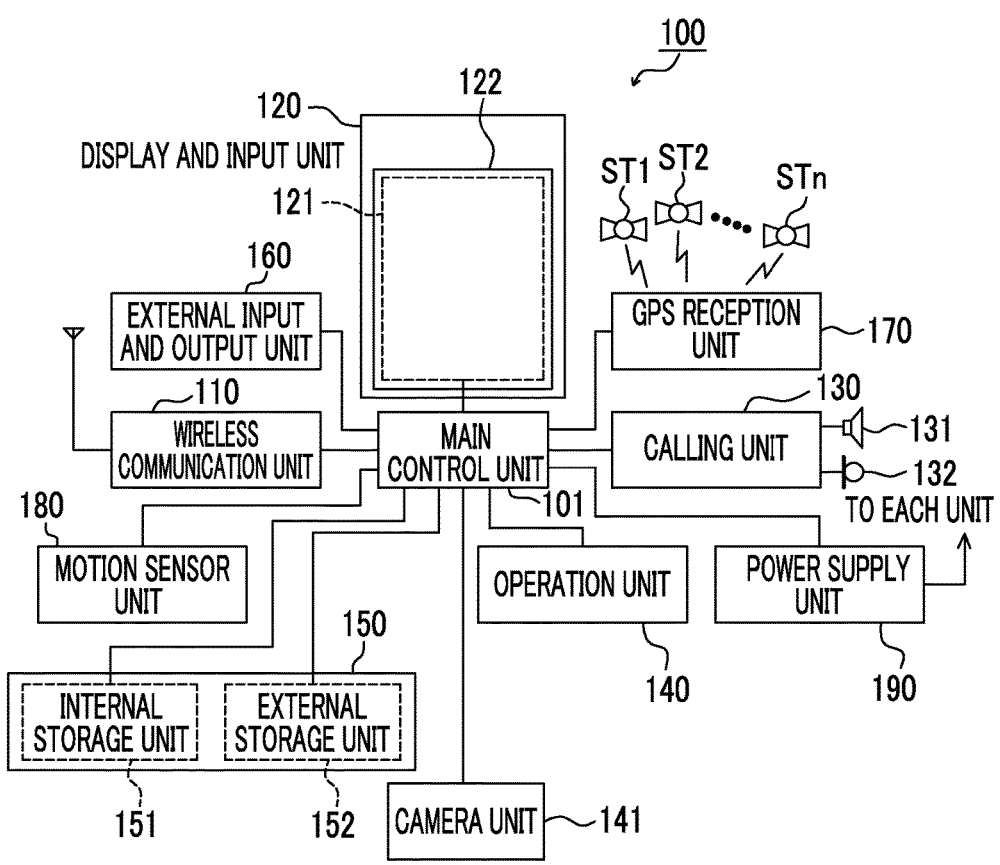
FIG. 3 is a block diagram illustrating a configuration of a smartphone.

FIG. 3 is a block diagram illustrating a configuration of the smartphone 100 illustrated in FIG. 1.

As illustrated in FIG. 3, main components of the smartphone 100 include a wireless communication unit 110, a display and input unit 120, a calling unit 130, an operation unit 140, a camera unit 141, a storage unit 150, an external input and output unit 160, a global positioning system (GPS) reception unit 170, a motion sensor unit 180, a power supply unit 190, and a main control unit 101. Further, a main function of the smartphone 100 includes a wireless communication function of performing mobile wireless communication via a base station device and a mobile communication network.

The wireless communication unit 110 performs wireless communication with the base station device accommodated in the mobile communication network according to an instruction of the main control unit 101. Using this wireless communication, transmission and reception of various types of file data such as audio data and image data, e-mail data, or the like, or reception of web data, streaming data, or the like is performed. In this example, the wireless communication unit 110 of the smartphone 100 transmits an instruction input for various operations to the imaging device 10, or receives a live view image, an image for recording, or the like from the imaging device 10.

The display and input unit 120 is a so-called touch panel that displays an image (a still image and a video), text information, or the like to visually deliver information to a user under the main control unit 101, and detects a user operation for the displayed information. The display and input unit 120 includes a display panel 121 and an operation panel 122. In a case in which a 3D image is viewed, it is preferable for the display panel 121 to be a 3D display panel.

The display panel 121 uses a liquid crystal display (LCD), an organic electro-Luminescence display (OELD), or the like as a display device.

The operation panel 122 is a device that is placed so that an image displayed on a display surface of the display panel 121 can be viewed, and detects one or a plurality of coordinates manipulated by a finger of a user or a stylus. If this device is operated by the finger of the user or the stylus, the operation panel 122 outputs a detection signal generated by the operation to the main control unit 101. Then, the main control unit 101 detects an operation position (coordinates) on the display panel 121 based on the received detection signal.

As illustrated in FIG. 1, the display panel 121 and the operation panel 122 of the smartphone 100 are integrally formed to constitute a display and input unit 120, but the operation panel 122 is arranged to completely cover the display panel 121. In a case in which this arrangement is adopted, the operation panel 122 may also have a function of detecting a user operation for an area other than the display panel 121. In other words, the operation panel 122 may include a detection area (hereinafter referred to as a display area) for an overlapping portion which overlaps the display panel 121, and a detection area (hereinafter referred to as a non-display area) for an outer edge portion which does not overlap the display panel 121, other than the display area.

A size of the display area and a size of the display panel 121 may completely match, but do not need to necessarily match. Further, the operation panel 122 may include two sensitive areas including the outer edge portion and an inner portion other than the outer edge portion. Further, a width of the outer edge portion may be appropriately designed according to, for example, a size of a housing 102. Further, a position detection scheme adopted in the operation panel 122 may include a matrix switch scheme, a resistive film scheme, a surface acoustic wave scheme, an infrared scheme, an electromagnetic induction scheme, a capacitive scheme, and the like, and any one of the schemes may be adopted.

The calling unit 130 includes a speaker 131 or a microphone 132. The calling unit 130 converts voice of the user input via the microphone 132 into audio data which can be processed by the main control unit 101 and outputs the audio data to the main control unit 101, or decodes the audio data received by the wireless communication unit 110 or the external input and output unit 160 and outputs the audio data from the speaker 131. Further, as illustrated in FIG. 1, for example, the speaker 131 and the microphone 132 may be mounted on the same surface as the surface in which the display and input unit 120 is provided.

The operation unit 140 is a hardware key using a key switch or the like, and receives an instruction from the user. For example, the operation unit 140 is mounted on a lower surface in a lower portion in a display portion of the housing 102 of the smartphone 100, and is a push button switch that is turned ON when pressed by a finger or the like and turned OFF due to a restoring force of a spring or the like when the finger is released.

The storage unit 150 stores a control program or control data of the main control unit 101, address data associated with, for example, a name or a telephone number of a communication partner, transmitted and received e-mail data, web data downloaded by web browsing, or downloaded content data, and temporarily stores streaming data or the like. The storage unit 150 includes an internal storage unit 151 built in the smartphone and an external storage unit 152 having an external memory slot that is detachable. Each of the internal storage unit 151 and the external storage unit 152 constituting the storage unit 150 is realized using a storage medium, such as a flash memory type, hard disk type, multimedia card micro type, or card type of memory (for example, a Micro SD (registered trademark) memory), a random access memory (RAM), or a read only memory (ROM).

The external input and output unit 160 serves as an interface with all of external devices connected to the smartphone 100, and is directly or indirectly connected with other external devices through, for example, communication (for example, Universal Serial Bus (USB) or IEEE1394) or a network (for example, the Internet, wireless LAN, Bluetooth (registered trademark), radio frequency identification (RFID), infrared communication (Infrared Data Association: IrDA; registered trademark), UWB (Ultra Wideband; registered trademark), or ZigBee (registered trademark)).

Examples of the external device connected to the smartphone 100 include a wired/wireless headset, a wired/wireless external charger, a wired/wireless data port, a memory card or a subscriber identity module card (SIM)/user identity module card (UIM) connected via a card socket, an external audio and video device connected via an audio and video input/output (I/O) terminal, a wirelessly connected external audio and video device, a wiredly/wirelessly connected smartphone, a wiredly/wirelessly connected personal computer, a wiredly/wirelessly connected PDA, and an earphone. The external input-output unit can transfer data received from such an external device to each component inside the smartphone 100, or send internal data of the smartphone 100 to the external device.

The GPS reception unit 170 receives GPS signals that are transmitted from GPS satellites ST1 to STn, executes a positioning calculation process based on a plurality of received GPS signals, and detects a position including a latitude, a longitude, and an altitude of the smartphone 100 according to an instruction of the main control unit 101. When the GPS reception unit 170 can acquire position information from the wireless communication unit 110 or the external input and output unit 160 (for example, wireless LAN), the GPS reception unit 170 can also detect the position using the position information.

The motion sensor unit 180 includes, for example, a three-axis acceleration sensor, and detects a physical motion of the smartphone 100 according to an instruction of the main control unit 101. By detecting the physical movement of the smartphone 100, a movement direction or an acceleration of the smartphone 100 is detected. A result of the detection is output to the main control unit 101.

The power supply unit 190 supplies power accumulated in a battery (not illustrated) to each unit of the smartphone 100 according to an instruction of the main control unit 101.

The main control unit 101 includes a microprocessor. The main control unit 101 operates according to the control program or the control data stored in the storage unit 150 and generally controls each unit of the smartphone 100. Further, the main control unit 101 has a mobile communication control function of controlling each unit of a communication system, and an application processing function in order to perform audio communication or data communication through the wireless communication unit 110.

The application processing function is realized by the main control unit 101 operating according to application software stored in the storage unit 150. Examples of the application processing function includes an infrared communication function of controlling the external input and output unit 160 and performing data communication with a facing device, an e-mail function of performing transmission and reception of an e-mail, and a web browsing function of viewing web pages.

Further, the main control unit 101 has an image processing function of, for example, displaying an image on the display and input unit 120 based on image data (data of a still image or a video) such as received data or downloaded streaming data. The image processing function refers to a function of the main control unit 101 decoding the image data, performing image processing on a result of the decoding, and displaying the image on the display and input unit 120.

Further, the main control unit 101 executes display control for the display panel 121, and an operation detection control for detecting a user operation through the operation unit 140 or the operation panel 122.

Through the execution of the display control, the main control unit 101 displays an icon for starting up the application software or a software key such as a scroll bar, or displays a window for creating an e-mail. The scroll bar refers to a software key for receiving an instruction for moving an image display portion for a large image that cannot be fitted in the display area of the display panel 121.

Further, through the execution of the operation detection control, the main control unit 101 detects a user operation through the operation unit 140, or receives an operation for the icon or an input of a character string to an input field of the window or receives a request for scroll of a display image using the scroll bar via the operation panel 122.

Further, the main control unit 101 has a touch panel control function of determining whether an operation position for the operation panel 122 is the overlapping portion that overlaps the display panel 121 (display area) or the other outer edge portion (non-display area) that does not overlap the display panel 121, and controlling the sensitive area of the operation panel 122 or a display position of the software key, through the execution of the operation detection control.

Further, the main control unit 101 can also detect a gesture operation for the operation panel 122, and execute a preset function according to the detected gesture operation. The gesture operation refers to an operation of drawing a trajectory with a finger or the like, designating a plurality of positions simultaneously, or combining these and drawing a trajectory for at least one of a plurality of positions, rather than a conventional simple touch operation.

The camera unit 141 is a digital camera that performs electronic imaging using an imaging element such as a complementary metal oxide semiconductor (CMOS) or a charge-coupled device (CCD).

Further, the camera unit 141 can convert the image data obtained through imaging into, for example, compressed image data such as joint photographic coding experts group (JPEG), and record the compressed image data in the storage unit 150 or output the compressed image data via the external input and output unit 160 or the wireless communication unit 110 under the control of the main control unit 101.

In the smartphone 100 illustrated in FIG. 1, the camera unit 141 is mounted on the same surface as the display and input unit 120, but a mounting position of the camera unit 141 is not limited thereto and may be mounted on a back surface of the display and input unit 120. Alternatively, a plurality of camera units 141 may be mounted. In a case in which the plurality of camera units 141 are mounted, switching to the camera unit 141 provided for imaging may be performed and imaging may be performed using only such a camera unit 141, or imaging may be performed using the plurality of camera units 141 at the same time.

Further, the camera unit 141 can be used for various functions of the smartphone 100. For example, the image acquired by the camera unit 141 can be displayed on the display panel 121, or the image of the camera unit 141 can be used as one operation input of the operation panel 122. Further, when the GPS reception unit 170 detects the position, the GPS reception unit 170 can also detect the position by referring to the image from the camera unit 141. Further, the optical axis direction of the camera unit 141 of the smartphone 100 can be determined or a current use environment can be determined by referring to the image from the camera unit 141 without using the 3-axis acceleration sensor, or in combination with the 3-axis acceleration sensor. Of course, the image from the camera unit 141 can also be used within the application software.

In this embodiment, by downloading application software for operating the imaging device 10 over a network or the like, storing the application software in the storage unit 150, and operating the main control unit 101 according to the downloaded application software using the application processing function of the smartphone 100, the general-purpose smartphone 100 functions as a user interface (UI unit) for operating the imaging device 10.

[Content of Operation of Imaging Device 10]

Figure 4:
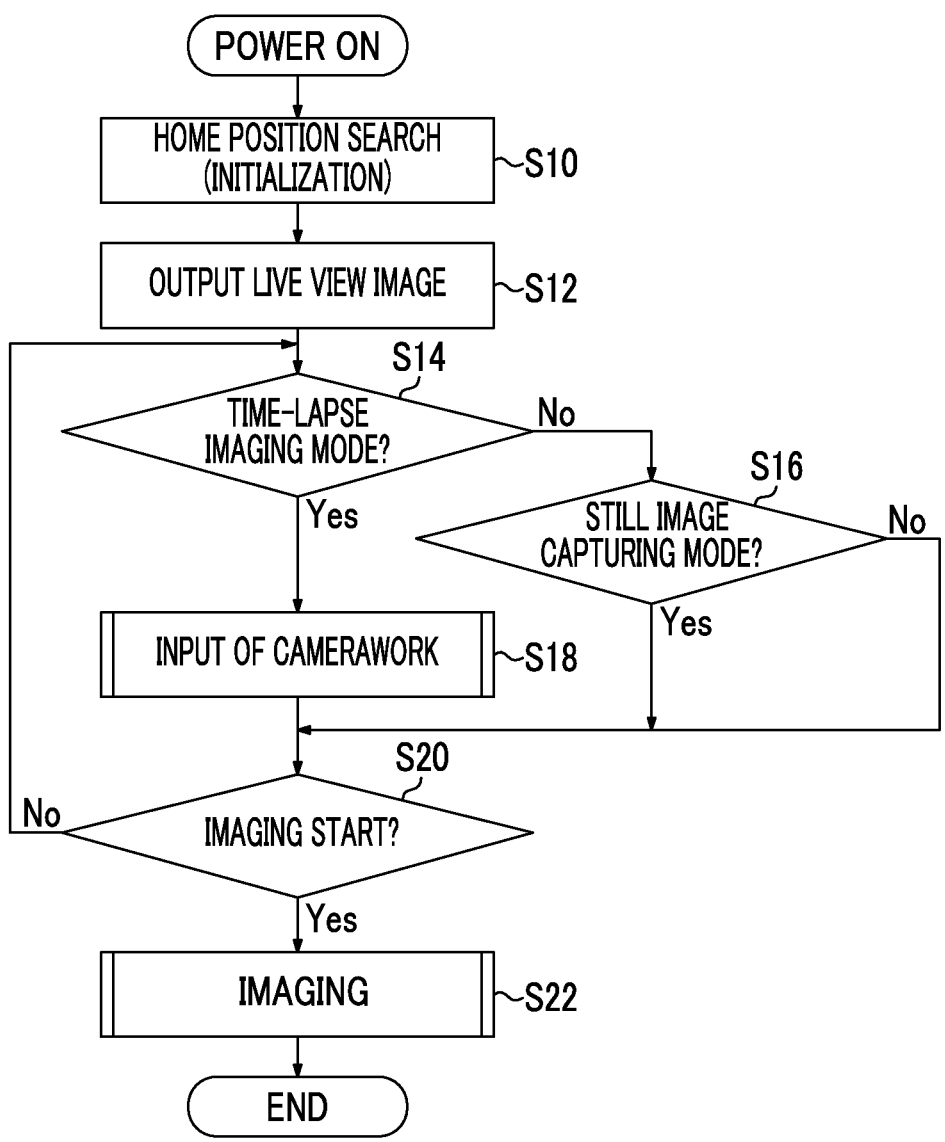
FIG. 4 is a flowchart illustrating an overview of operation content of the imaging device according to the present invention.

FIG. 4 is a flowchart illustrating an overview of content of an operation of the imaging device 10 according to the present invention.

In FIG. 4, when the power switch included in the operation unit 60 is turned ON, the camerawork control unit 46 of the imaging device 10 outputs a preset home position search instruction to the pan and tilt control unit 44, and the pan and tilt control unit 44 operates the pan and tilt mechanism 32 through the pan driving unit 34 and the tilt driving unit 36 according to the home position search instruction (step S10).

Here, the home position search instruction is an instruction to move the imaging unit 20 in certain pan and tilt directions until the home position sensors (for example, photo interrupters) respectively disposed at end portions in the pan direction and the tilt direction detect a detected portion (for example, a light-shielding member) provided in the imaging unit 20. A position in which the home position sensors provided in the pan direction and the tilt direction detect the detected portion provided in the imaging unit 20 is a home position in the pan direction and the tilt direction. Each of the pan driving unit 34 and the tilt driving unit 36 includes an up-down counter that counts a pulse signal for driving the stepping motor. If the home position sensors detect the home position during home position search, the pan driving unit 34 and the tilt driving unit 36 reset the up-down counters to zero and cause the imaging unit 20 to wait in the home position. After the up-down counters are reset, count values of the up-down counters that count the pulse signal for driving the stepping motor become values corresponding to the angles in the pan direction and the tilt direction. That is, the home position sensors and the up-down counters provided in the pan direction and the tilt direction correspond to the angle detection units that respectively detect the pan and tilt angles of the imaging unit 20. Angle detectors (for example, rotary encoder) may be provided at an axis in the vertical direction Z and an axis in the horizontal direction X illustrated in FIG. 1 to detect the pan angle and the tilt angle, respectively.

Subsequently, the imaging control unit 42 controls the imaging unit 20 so that capturing of the live view image is performed. The live view image read from the imaging unit 20 and processed by the signal processing unit 41 is transmitted to the smartphone 100 via the wireless communication unit 50 (step S12). Therefore, the photographer can observe the live view image on the display panel 121 of the smartphone 100.

Then, the imaging device 10 determines which of the time-lapse imaging mode, the still image capturing mode, and the video imaging mode is set (steps S14 and S16). That is, the imaging device 10 has the imaging modes such as the time-lapse imaging mode, the still image capturing mode, and the video imaging mode, and determines which of the imaging modes is set based on a mode selection instruction input from the operation unit 60 or the smartphone 100.

In a case in which the time-lapse imaging mode is set, the camerawork control unit 46 receives an instruction input for specifying the camerawork in the time-lapse imaging from smartphone 100 via the wireless communication unit 50 (step S18).

[Camerawork Setting UI at Time of Time-Lapse Imaging]

Figure 5:
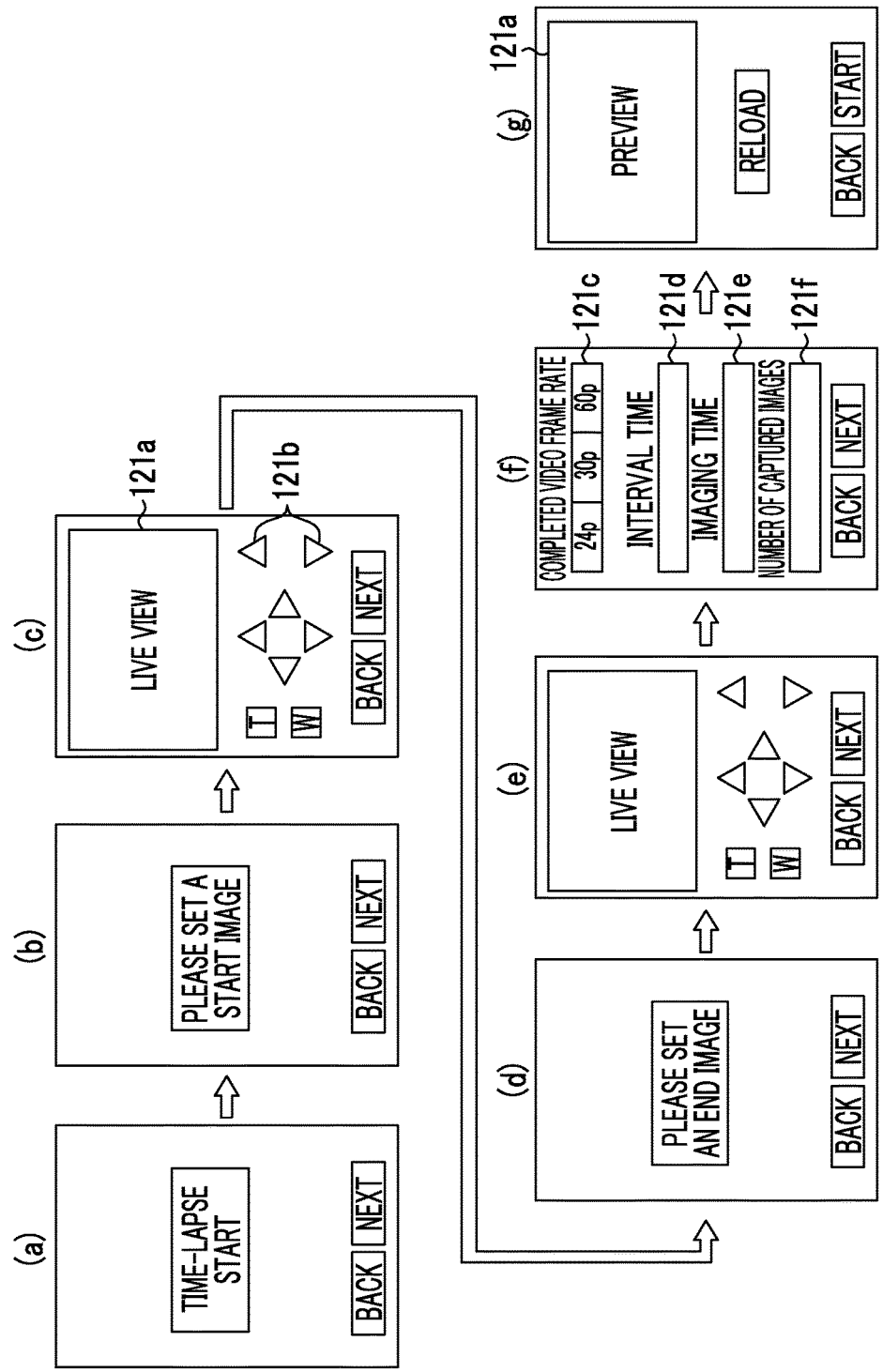
FIG. 5 is a transition diagram of a screen displayed on a display panel of a smartphone at the time of time-lapse imaging.

FIG. 5 is a transition diagram of a screen displayed on the display panel 121 of the smartphone 100 at the time of time-lapse imaging. In the imaging device 10, it is assumed that the time-lapse imaging mode is set.

The camerawork refers to a motion of the imaging device 10 (imaging unit 20). However, in this example, the camerawork refers to a pan operation and a tilt operation, a zoom operation (in a case in which the zoom lens is used), a dolly operation (a motion of a dolly in a case in which a dolly device is used), and a crane operation (a motion of a crane in a case in which a crane device is used) of the imaging unit 20.

An instruction input for specifying, for example, the pan and tilt operation at least in time-lapse imaging, and an interval time (imaging interval) for capturing a still image, an imaging time (imaging period of time), or the number of captured images is necessary to set the camerawork for performing the time-lapse imaging that uses the pan and tilt mechanism.

Further, in this example, an imaging direction (pan and tilt angles) of the imaging unit 20 when a start image of the time-lapse imaging is captured, and pan and tilt angles of the imaging unit 20 of an end image are assumed to be the instruction input for specifying the pan and tilt operation.

As illustrated in FIG. 5, in a case in which the smartphone 100 is used as a user interface (UI) for setting the camerawork for specifying the time-lapse imaging (if application software for time-lapse imaging only is started up), an initial screen illustrated in a portion (a) of FIG. 5 is displayed on the display panel 121 of the smartphone 100. In the initial screen, text "Time lapse start", and soft buttons including a "BACK" button and a "NEXT" button are displayed. The "BACK" button is a button for returning, for example, a screen and a process, and the "NEXT" button is a button for advancing, for example, the screen and the process.

Here, if the "NEXT" button is tapped, a screen illustrated in a portion (b) of FIG. 5 is displayed on the display panel 121. In this screen, text "Please set a start image", and soft buttons including a "BACK" button and a "NEXT" button are displayed.

Then, if the "NEXT" button is tapped, a screen for setting the pan and tilt angles of the start image illustrated in portion (c) of FIG. 5 is displayed on the display panel 121. In a screen illustrated in portion (c) of FIG. 5, a live view image is displayed in the image display portion 121a, and a cross button including up, down, left, and right buttons for causing the pan and tilt mechanism 32 to perform a pan and tilt operation, a T button/W button for causing the zoom lens to perform a zoom operation in a telephoto direction or a wide direction, a button 121b for operating a dolly device or a crane device having the imaging device mounted thereon, a "BACK" button, and a "NEXT" button are displayed on the lower side of the image display portion 121a.

If the photographer taps a left button or a right button of the cross button, an operation instruction for causing the imaging unit 20 to perform a pan operation in the left or right direction is transmitted from the smartphone 100 to the imaging device 10. If the pan and tilt control unit 44 receives the operation instruction for causing to perform the pan operation via the wireless communication unit 50, the pan and tilt control unit 44 causes the imaging unit 20 to perform a pan operation in the left or right direction through the pan driving unit 34 and the pan and tilt mechanism 32. With the pan operation of the imaging unit 20, the live view image displayed on the image display portion 121a is moved in a left and right direction.

Similarly, when the photographer taps an up button or a down right button of the cross button, an operation instruction for causing the imaging unit 20 to perform a tilt operation in the up or down direction is transmitted from the smartphone 100 to the imaging device 10. If the pan and tilt control unit 44 receives the operation instruction for causing to perform the tilt operation via the wireless communication unit 50, the pan and tilt control unit 44 causes the imaging unit 20 to perform a tilt operation in the up or down direction through the tilt driving unit 36 and the pan and tilt mechanism 32. With the tilt operation of the imaging unit 20, the live view image displayed on the image display portion 121a is moved in an up and down direction.

That is, the photographer can cause the imaging unit 20 to perform a pan and tilt operation and cause a desired start image to be displayed as the live view image by operating the cross button while viewing the live view image displayed on the image display portion 121a. If the photographer taps the "NEXT" button in a state in which the desired start image is displayed as the live view image, the screen transitions to a screen illustrated in a portion (d) of FIG. 5, and a setting instruction regarding the start image is transmitted to the imaging device 10. If the setting instruction for the start image is received, the camerawork control unit 46 of the imaging device 10 acquires the pan and tilt angles of the imaging unit 20 capturing the start image via the pan and tilt control unit 44. Further, in a case in which the imaging lens 22 is the zoom lens, the camerawork control unit 46 acquires the zoom magnification of the imaging unit 20 capturing the start image from the lens driving unit 26. Further, in a case in which the imaging device 10 is mounted on a dolly device or a crane device, the camerawork control unit 46 acquires position information of the dolly device or the crane device capturing the start image from the dolly and crane control unit 45.

A text "Please set the end image", a "BACK" button, and a "NEXT" button are displayed in a screen illustrated in portion (d) of FIG. 5. Here, if the "NEXT" button is tapped, a screen for setting, for example, the pan and tilt angles of the end image illustrated in portion (e) of FIG. 5 is displayed on the display panel 121. An operation for setting, for example, the pan and tilt angles of the end image is performed similarly to the operation on the screen for setting, for example, the pan and tilt angles of the start image illustrated in portion (c) of FIG. 5. If the "NEXT" button is tapped in a state in which the desired end image is displayed as the live view image, transition to a screen illustrated in portion (f) of FIG. 5 is performed, and a setting instruction regarding the end image is transmitted to the imaging device 10. Accordingly, the camerawork control unit 46 acquires information including the pan and tilt angles regarding the end image, similar to the start image.

A screen illustrated in a portion (f) of FIG. 5 is a screen for setting the camerawork such as a frame rate, an interval time (imaging interval), an imaging time (imaging period of time), and the number of captured images. A frame rate setting portion 121c, an interval time setting portion 121d, an imaging time setting portion 121e, a number-of-captured-images setting portion 121f, a "BACK" button, and a "NEXT" button are displayed.

The frame rate setting portion 121c is a software button for setting the number of frames (24 p, 30 p, and 60 p) per second of a time-lapse video. For example, if a display portion of "24 p" of the frame rate setting portion 121c is tapped, the frame rate of 24 frames per second is set.

The interval time setting portion 121d is a portion for setting the imaging interval (interval time) of a still image captured through time-lapse imaging. If the interval time setting portion 121d is tapped, a numeric keypad is popped up, and a photographer can set the interval time using the numeric keypad.

The imaging time setting portion 121e is a portion for setting the imaging time (imaging period of time) of the time-lapse imaging. If the imaging time setting portion 121e is tapped, a numeric keypad is popped up, and the photographer can set the imaging time using the numeric keypad. An imaging start time and an imaging end time may be set.

The number-of-captured-images setting portion 121f is a portion for setting the number of captured still images that are captured through time-lapse imaging. If the number-of-captured-images setting portion 121f is tapped, a numeric keypad is popped up, and the photographer can set the number of captured images using the numeric keypad. A playback time may be set, instead of setting the number of captured images. This is because, if the frame rate and the playback time are set, the number of captured images can be automatically calculated using playback time (sec)×number of frames per second (frame rate).

Further, if two of the interval time, the imaging time, and the number of captured images are set, the other can be automatically calculated. Accordingly, it is preferable for a result of the calculation to be displayed in a corresponding setting portion.

After, for example, the interval time, the imaging time, and the number of captured images are set using the screen illustrated in the portion (f) of FIG. 5, if the "NEXT" button is tapped, the screen transitions to a screen illustrated in a portion (g) of FIG. 5, and information indicating, for example, the interval time, the imaging time, and the number of captured images is transmitted to the imaging device 10.

If the camerawork control unit 46 of the imaging device 10 receives the information indicating the interval time, the imaging time, and the number of captured images, the camerawork control unit 46 acquires this information as an instruction input for specifying the camerawork.

Further, if the camerawork control unit 46 acquires all of the instruction inputs for specifying the camerawork, the camerawork control unit 46 controls the pan and tilt mechanism through the pan and tilt control unit 44 based on the information including the pan and tilt angles regarding the start image and the end image to capture a live view image from the start image to the end image, and transmits the captured live view image (preview image) to the smartphone 100.

Accordingly, a preview image (an image in which time is not compressed) corresponding to the image captured through time-lapse imaging is displayed in the image display portion 121a of the screen illustrated in the portion (g) of FIG. 5. The camerawork can be confirmed using the preview image.

Further, in the screen illustrated in the portion (g) of FIG. 5, a "RELOAD" button, a "BACK" button, and a "START" button are displayed. If the "RELOAD" button is tapped, a playback instruction for a preview image is transmitted from the smartphone 100 to the imaging device 10. Accordingly, it is possible to re-confirm the preview image.

The "START" button is a button for starting the time-lapse imaging. If the "START" button is tapped, a start instruction for time-lapse imaging is transmitted to the imaging device 10. If the start instruction for time-lapse imaging is received, the camerawork control unit 46 of the imaging device 10 controls, for example, the pan and tilt mechanism 32 based on the instruction input indicating the camerawork, and the imaging control unit 42 controls the imaging unit 20 so that the time-lapse imaging is performed.

In FIG. 5, although the "BACK" button is a button for returning, for example, the screen and the process to a directly previous screen and a directly previous process, the "BACK" button illustrated in portion (c) of FIG. 5 may function as a button for returning the screen and the process to a screen before two screens and a process before two processes, and the "BACK" button illustrated in portion (e) of FIG. 5 may function as a button for returning the screen and the process to a screen before three screens and a process before three processes.

Although the instruction input for specifying the camerawork in the time-lapse imaging is performed using the smartphone 100 as described above, the instruction input may be performed using the operation unit 60 and the display unit 61 of the imaging device 10.

Figure 6:
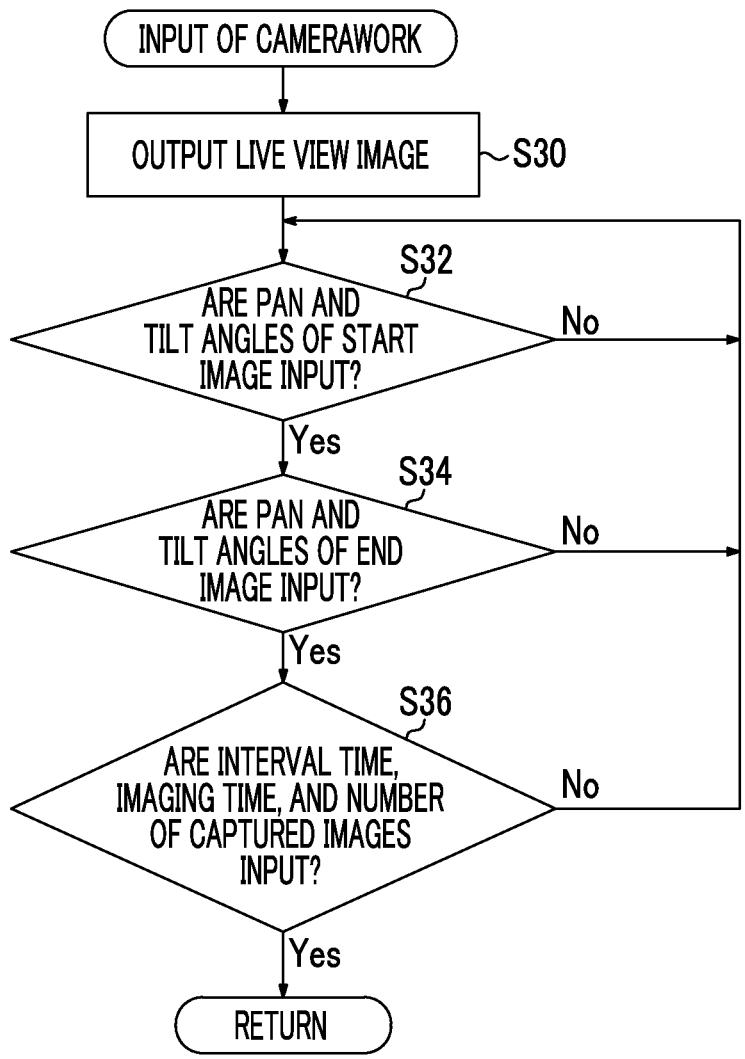
FIG. 6 is a flowchart illustrating an embodiment of an input process of camerawork of FIG. 4.

In response to the operation in the smartphone 100, a process illustrated in FIG. 6 is performed on the imaging device 10 side.

FIG. 6 is a flowchart illustrating an embodiment of the process in step S18 of FIG. 4.

In FIG. 6, the imaging control unit 42 controls the imaging unit 20 so that capturing of the live view image is performed, and transmits the live view image from the wireless communication unit 50 to the smartphone 100 (step S30).

Subsequently, the camerawork control unit 46 determines whether or not the pan and tilt angles of the start image and the pan and tilt angles of the end image are input (steps S32 and S34). In a case in which the setting instruction regarding the start image and the end image is received from the smartphone 100, and information including the pan and tilt angles regarding the start image and the end image is acquired as described with reference to FIG. 5, it is determined that the pan and tilt angles have been input.

Then, the camerawork control unit 46 determines whether at least two pieces of information among the interval time, the imaging time, and the number of captured images have been received (or input) from the smartphone 100 (Step S36).

If it is determined in steps S32 to S36 that there are at least two instruction inputs among the instruction input including the pan and tilt angles regarding the start image and the end image, the interval time, the imaging time, and the number of captured images, all of instruction inputs for specifying the camerawork at the time of time-lapse imaging end, and the process (input of the camerawork) of step S18 illustrated in FIG. 4 is completed.

Then, in FIG. 4, the imaging device 10 determines whether or not there is an instruction input for start of imaging (step S20). If there is the instruction input of start of imaging, imaging in the currently set imaging mode starts (step S22).

Figure 7:
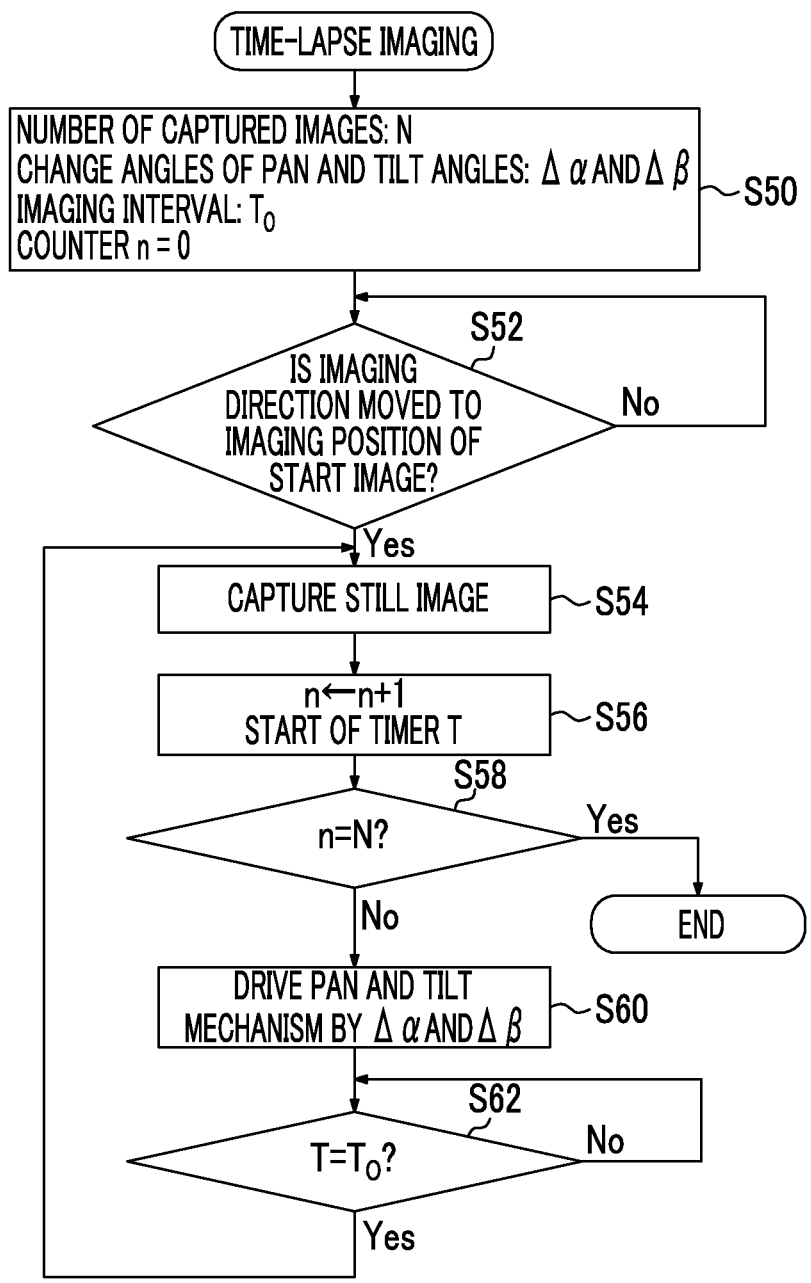
FIG. 7 is a flowchart illustrating an imaging operation in a case in which a time-lapse imaging mode is set.

FIG. 7 is a flowchart illustrating an imaging operation in a case in which the time-lapse imaging mode is set.

First, the number N of captured images, change angles $\Delta\alpha$ and $\Delta\beta$ of the pan and tilt angles, and the imaging interval $T_O$ are set based on the instruction input for specifying the camerawork in time-lapse imaging (step S50). Here, if the pan angle of the start image is $\alpha_S$ and the pan angle of the end image is $\alpha_E$, the change angle $\Delta\alpha$ of the pan angle can be calculated using the following equation.

$$\Delta\alpha=(\alpha_E-\alpha_S)/N \qquad \text{[Equation 1]}$$

Similarly, if the tilt angle of the start image is $\beta_S$ and the tilt angle of the end image is $\beta_E$, the change angle $\Delta\beta$ of the tilt angle can be calculated using the following equation.

$$\Delta\beta=(\beta_E-\beta_S)/N \qquad \text{[Equation 2]}$$

Further, in step S50, a counter n that counts the number of captured images is set to n=0.

Subsequently, it is determined whether or not the imaging direction of the imaging unit 20 is moved to an imaging position (the pan angle $\alpha_S$ and the tilt angle $\beta_S$) for capturing a pan start image (step S52). In a case in which the imaging direction is moved to the imaging position for capturing the start image ("Yes"), the process transitions to step S54. If the setting of the camerawork for specifying the time-lapse imaging ends, it is preferable for the imaging unit 20 to be moved to the imaging position for capturing the start image.

In step S54, the imaging unit 20 is controlled by the imaging control unit 42, and capturing of a still image is performed. A digital signal representing the still image output from the imaging unit 20 by the imaging operation is subjected to appropriate signal processing by the signal processing unit 41, and then, is temporarily stored in the memory 62.

Then, the counter n that counts the number of captured images is incremented by 1, and a timer T that measures the imaging interval $T_O$ is reset to 0 and started (step S56).

The camerawork control unit 46 determines whether or not the counter n that counts the number of captured images reaches the set number N of captured images (step S58). In a case in which the counter n reaches the number N of captured images ("Yes"), the time-lapse imaging ends, and in a case in which the counter n does not reach the number N of captured images ("No"), the process transitions to step S60.

In step S60, the camerawork control unit 46 outputs an instruction value for driving the pan and tilt mechanism 32 by the change angles $\Delta\alpha$ and $\Delta\beta$ of the pan and tilt angles to the pan and tilt control unit 44. That is, the camerawork control unit 46 generates an instruction value obtained by adding the change angles $\Delta\alpha$ and $\Delta\beta$ to a previous instruction value, and outputs the instruction value to the pan and tilt control unit 44. The pan and tilt control unit 44 drives the pan driving unit 34 and the tilt driving unit 36 based on the instruction value input from the camerawork control unit 46, to move the pan and tilt mechanism 32 by the change angles $\Delta\alpha$ and $\Delta\beta$.

Then, the camerawork control unit 46 determines whether or not a measurement time of the timer T reaches the imaging interval $T_O$ (Step S62). If the measurement time reaches the imaging interval $T_O$, the process transitions to step S54 to perform capturing of the next still image.

The process from step S54 to step S62 is repeatedly performed until the number n of captured images reaches the preset number N of captured images.

If the time-lapse imaging ends, an image for recording is generated based on a plurality of still images temporarily stored in the memory 62 through the time-lapse imaging. That is, the signal processing unit 41 functions as a recording image generation unit that generates the image for recording obtained by connecting the plurality of still images captured through time-lapse imaging, and generates a video file of a time-lapse video conforming to a video recording format.

The generated video file is transmitted from the wireless communication unit 50 to the smartphone 100, and recorded on a recording medium of the smartphone 100. The present invention is not limited to the case of generating the video file, and a multi picture object (MPO) file conforming to a multi-picture format obtained by connecting respective still images (individual images) may be generated, and the generated MPO file may be transmitted to the smartphone 100.

Figure 8:
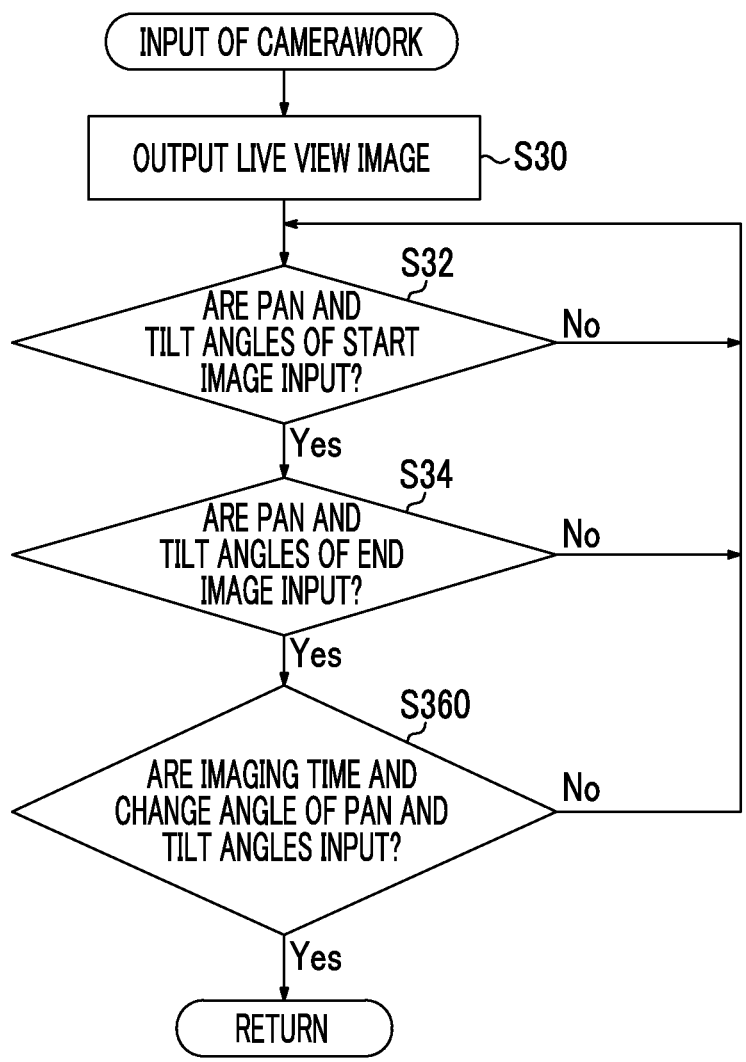
FIG. 8 is a flowchart illustrating another embodiment of the input process of the camerawork of FIG. 4.

FIG. 8 is a flowchart illustrating another embodiment of the process in step S18 of FIG. 4. Portions common to the flowchart illustrated in FIG. 6 are denoted with the same step signs, and detailed description thereof will be omitted.

In step S360 illustrated in FIG. 8, it is determined whether or not the imaging time and the change in the pan angle or tilt angle are input from the smartphone 100. That is, in FIG. 5, the smartphone 100 includes the UI unit that can transmit setting information such as the interval time, the imaging time, and the number of captured images in the time-lapse imaging as an instruction input for specifying the camerawork, but in this example, the smartphone 100 further includes an operation unit that can input the change in the pan angle or the tilt angle, so that the smartphone 100 can input an imaging time of time-lapse imaging, and the change in the pan angle or the change in the tilt angle. In a case in which the change in the pan angle is input, the number of captured still images that are captured through time-lapse imaging can be calculated by dividing an angle of a difference in the pan angle between the start image and the end image by the change in the pan angle, and the interval time of the still images can be calculated by dividing the set imaging time of the time-lapse imaging by the calculated number of captured still images. Therefore, in a case in which the imaging time of the time-lapse imaging and the change in the pan angle or the change in the tilt angle are input, it is preferable for the smartphone 100 to display the calculated number of captured images and the calculated interval time.

As described above, in a case in which the imaging time and the change in the pan angle or the change in the tilt angle are input in the smartphones 100, and information indicating the imaging time and the change in the pan angle or the change in the tilt angle are received from the smartphone 100, the camerawork control unit 46 determines that the imaging time and the change in the pan angle or the tilt angle are input (step S360).

If it is determined in steps S32, S34, and S360 that there are the instruction input including the pan and tilt angles regarding the start image and the end image, and the instruction input of the imaging time and the change in the pan angle or the change in the tilt angle, all of the instruction inputs for specifying the camerawork at the time of time-lapse imaging end, and the process of step S18 (input of the camerawork) illustrated in FIG. 4 ends.

[Other Embodiments of Time-Lapse Imaging Using Pan and Tilt Mechanism]

Figure 9:
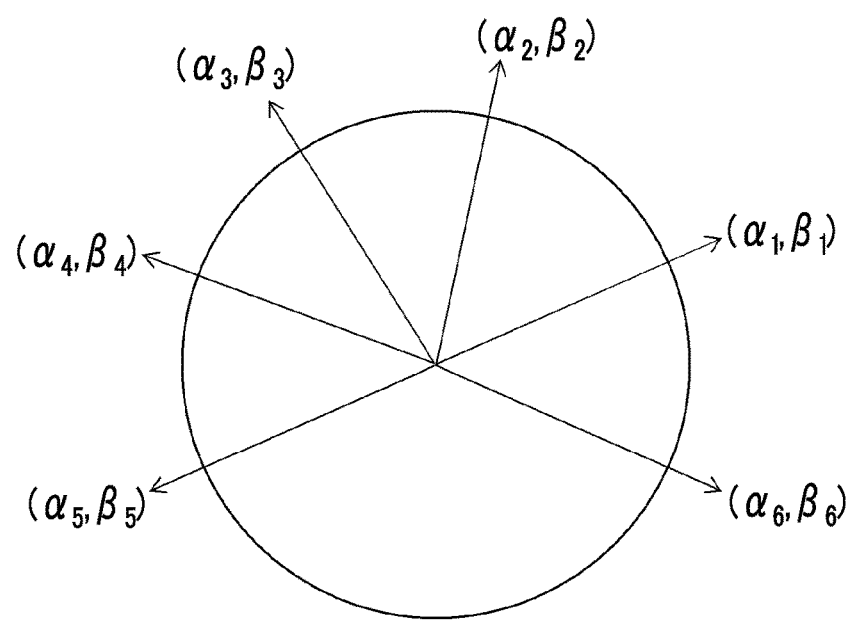
FIG. 9 is a conceptual diagram illustrating another embodiment of time-lapse imaging using a pan and tilt mechanism.

FIG. 9 is a conceptual diagram illustrating another embodiment of time-lapse imaging using the pan and tilt mechanism.

Since the imaging direction of the imaging unit 20 (the optical axis direction L of the imaging unit 20) can be controlled to be an arbitrary direction by using the pan and tilt mechanism 32, it is possible to perform the time-lapse imaging in a plurality of imaging directions.

In an example illustrated in FIG. 9, six imaging directions (the pan and tilt angles $(\alpha_1, \beta_1)$ to $(\alpha_6, \beta_6)$) are illustrated, and the time-lapse imaging can be performed in the six imaging directions by using the pan and tilt mechanism 32. That is, by controlling the pan and tilt mechanism 32 (cyclic control) so that the optical axis direction of the imaging unit 20 is directed in the six imaging directions sequentially and repeatedly and causing imaging by the imaging unit 20 to be performed, it is possible to perform time-lapse imaging on six subjects in different imaging directions.

Figure 10:
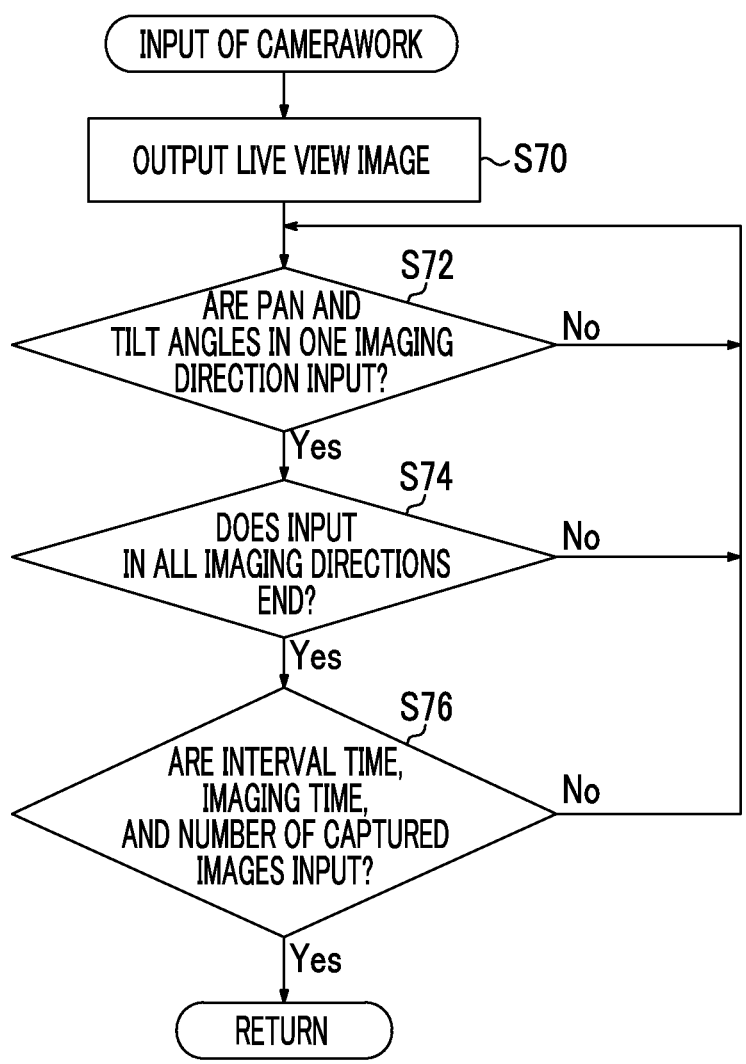
FIG. 10 is a flowchart illustrating another embodiment of the input process of camerawork for performing time-lapse imaging.

FIG. 10 is a flowchart illustrating an input process of the camerawork for performing time-lapse imaging in the other embodiment. The instruction input for specifying the camerawork can be provided from the smartphone 100 to the imaging device 10 through wireless communication, but may be input using the operation unit 60 and the display unit 61 of the imaging device 10.

In FIG. 10, the imaging control unit 42 controls the imaging unit 20 so that capturing of the live view image is performed, and transmits the live view image from the wireless communication unit 50 to the smartphone 100 (step S70).

Subsequently, the camerawork control unit 46 determines whether or not the pan and tilt angles corresponding to one imaging direction are input (step S72). That is, the photographer operates the pan and tilt mechanism 32 using the smartphone 100 while viewing the live view image displayed on the smartphone 100, and matches the imaging unit 20 with a subject in a desired imaging direction (azimuth) (adjusts the pan and tilt angles of the imaging unit 20). If an instruction input for confirming the imaging direction is received, the camerawork control unit 46 acquires the pan and tilt angles corresponding to one imaging direction. Thus, in a case in which the pan and tilt angles corresponding to one imaging direction are acquired, it is determined that the pan and tilt angles are input.

Subsequently, the camerawork control unit 46 determines whether or not the input of the pan and tilt angles corresponding to all the imaging directions ends (step S74). This determination can be performed according to content of the operation of the smartphone 100 by the photographer (for example, an instruction input for setting end of the pan and tilt angles, or an setting operation for things other than the pan and tilt angles).

In a case in which the input of the pan and tilt angles corresponding to all of the imaging directions does not end ("No"), the process transitions to step S72, and an input of an acquisition instruction for the pan and tilt angles corresponding to the next imaging direction is waited for. In a case in which the input of the pan and tilt angles corresponding to all of the imaging directions ends ("Yes"), the process transitions to step S76.

If the process transitions to step S76, the camerawork control unit 46 determines whether at least two pieces of information among the interval time, the imaging time, and the number of captured images are received (or input) from the smartphone 100.

If it is determined in steps S72 to S76 that there are at least two instruction inputs among the instruction input including the pan and tilt angles corresponding to all the imaging directions, the interval time, the imaging time, and the number of captured images, all of instruction inputs for specifying the camerawork at the time of time-lapse imaging in a plurality of imaging directions end, and the process (input of the camerawork) of step S18 illustrated in FIG. 4 ends.

Then, in FIG. 4, the imaging device 10 determines whether or not there is an instruction input for start of imaging (step S20). If there is the instruction input of start of imaging, imaging in the currently set imaging mode starts (step S22).

Figure 11:
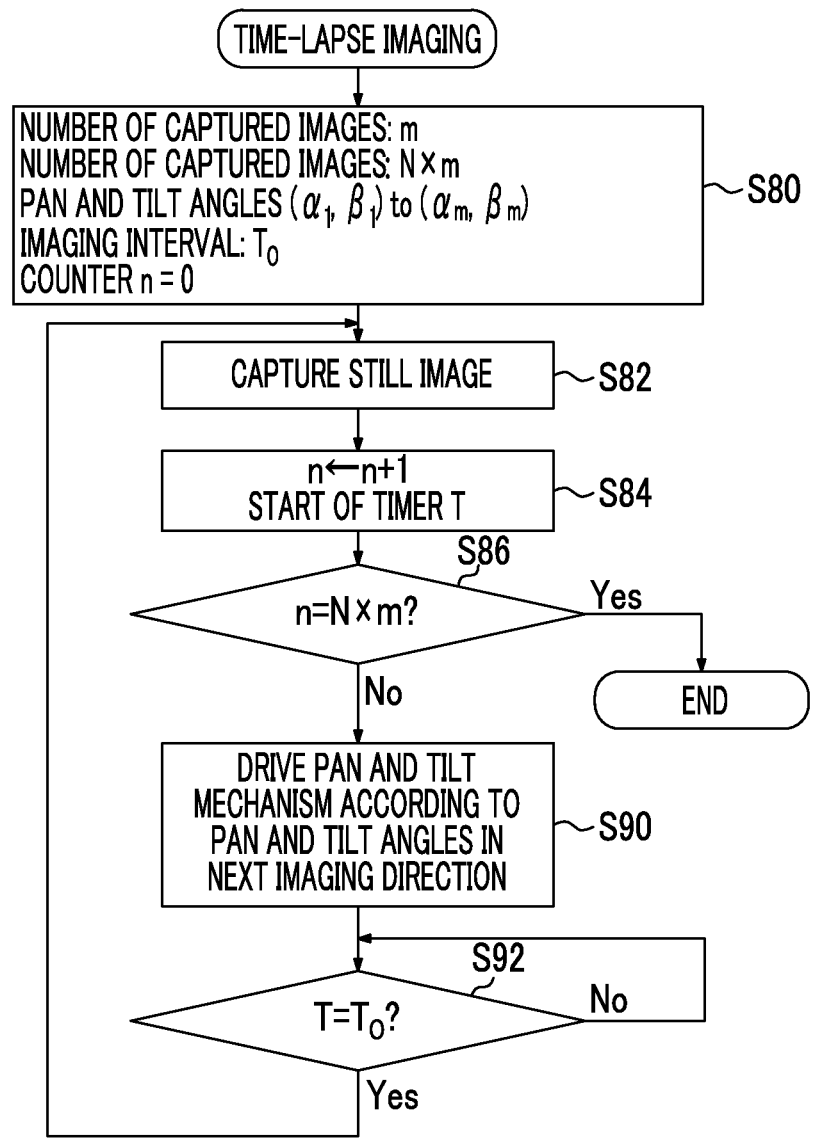
FIG. 11 is a flowchart illustrating an imaging operation in a case in which time-lapse imaging in a plurality of imaging directions is performed.

FIG. 11 is a flowchart illustrating the imaging operation in a case in which time-lapse imaging in a plurality of imaging directions is performed.

First, the number m of imaging directions, the number N×m of captured images, the pan and tilt angles $(\alpha_1, \beta_1)$ to $(\alpha_m, \beta_m)$, and the imaging interval $T_O$ are set based on the instruction input for specifying the camerawork in time-lapse imaging in a plurality of imaging directions (step S80).

Here, N is the number of captured images of time-lapse imaging in one imaging direction. In a case in which the number of imaging directions is m, a total number of captured images becomes N×m. Further, the imaging interval $T_O$ can be calculated by dividing the imaging time by the number N×m of captured images.

Further, in step S80, the counter n that counts the number of captured images is set to n=0.

Then, the imaging unit 20 is controlled by the imaging control unit 42, and still image capturing is performed (step S82). A digital signal representing the still image output from the imaging unit 20 through the imaging operation is subjected to appropriate signal processing by the signal processing unit 41, and then, temporarily stored in the memory 62. It is assumed that the pan and tilt mechanism 32 is controlled based on any one of the set pan and tilt angles $(\alpha_1, \beta_1)$ to $(\alpha_m, \beta_m)$, and the imaging unit 20 is controlled so that the imaging optical axis is directed to any one of a plurality of imaging directions.

Subsequently, the counter n that counts the number of captured images is incremented by 1, and the timer T that measures the imaging interval $T_O$ is reset to 0 and started (step S84).

The camerawork control unit 46 determines whether or not the counter n that counts the number of captured images reaches the set number N×m of captured images (step S86). In a case in which the counter n reaches the number N×m of captured images ("Yes"), the time-lapse imaging ends, and in a case in which the counter n does not reach the number N×m of captured images ("No"), the process transitions to step S90.

In step S90, the camerawork control unit 46 outputs the pan and tilt angles corresponding to the next imaging direction to the pan and tilt control unit 44. The pan and tilt control unit 44 drives the pan driving unit 34 and the tilt driving unit 36 based on an instruction value indicating the pan and tilt angles input from the camerawork control unit 46, to move the pan and tilt mechanism 32.

Then, the camerawork control unit 46 determines whether or not the measurement time of the timer T reaches the imaging interval $T_O$ (Step S92). If the measurement time reaches the imaging interval $T_O$, the process transitions to step S82, and next still image capturing is performed.

The process of steps S82 to S92 is repeatedly performed until the number n of captured images reaches the preset number N×m of captured images. Further, if the instructed pan and tilt angles reach ($\alpha_m$, $\beta_m$), the pan and tilt angles to be next instructed returns to ($\alpha_1$, $\beta_1$). Accordingly, imaging in a plurality of imaging directions is cyclically performed.

If the time-lapse imaging ends, an image for recording is generated based on the N×m still images temporarily stored in the memory 62 through the time-lapse imaging. In this case, m images for recording of which the imaging directions are different are generated by extracting the still images in time series of which the imaging directions are the same and connecting the extracted still images.

The generated images for recording are transmitted from the wireless communication unit 50 to the smartphone 100, and recorded on the recording medium of the smartphone 100.

Accordingly, it is possible to simultaneously acquire a plurality of time-lapse videos of which the imaging direction (subject) is different and to effectively utilize the imaging time.

[Combination of Imaging Device and Dolly Device]

Figure 12:
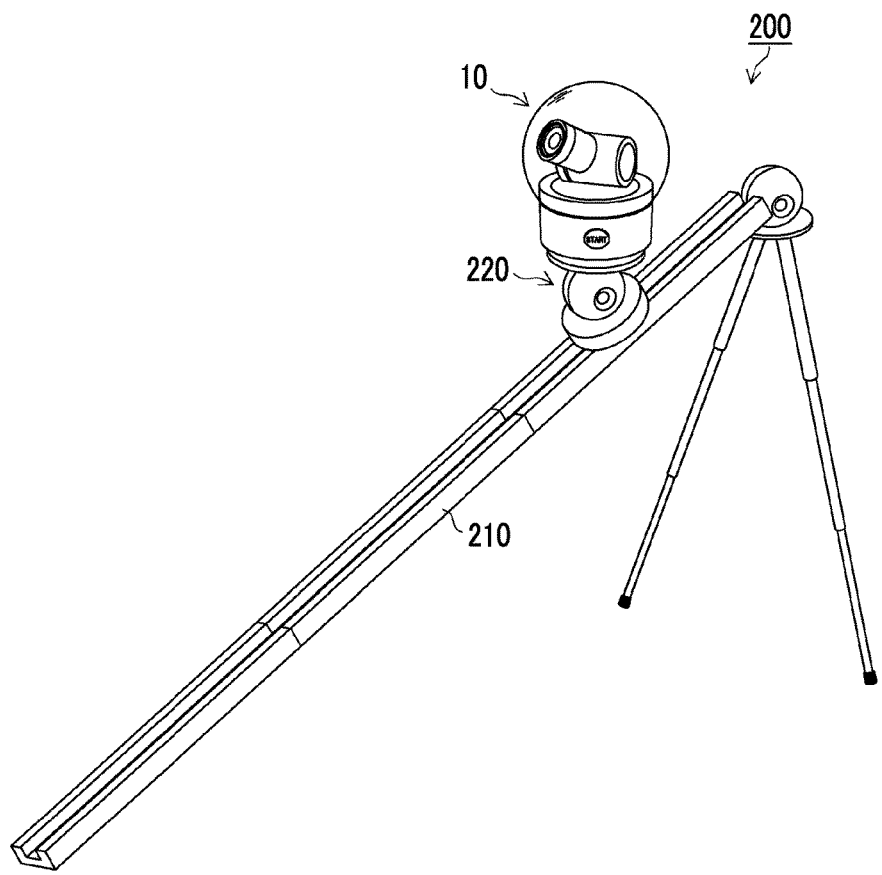
FIG. 12 is a perspective view illustrating a state in which the imaging device is mounted on a dolly device.

FIG. 12 is a perspective view illustrating a state in which the imaging device 10 having the above configuration is mounted with a dolly device 200.

This dolly device 200 includes a rail 210, and a dolly body 220 that moves on the rail 210, and the imaging device 10 is fixed to the dolly body 220 by a tripod mounting unit provided on a back surface of the device body 12.

Figure 13:
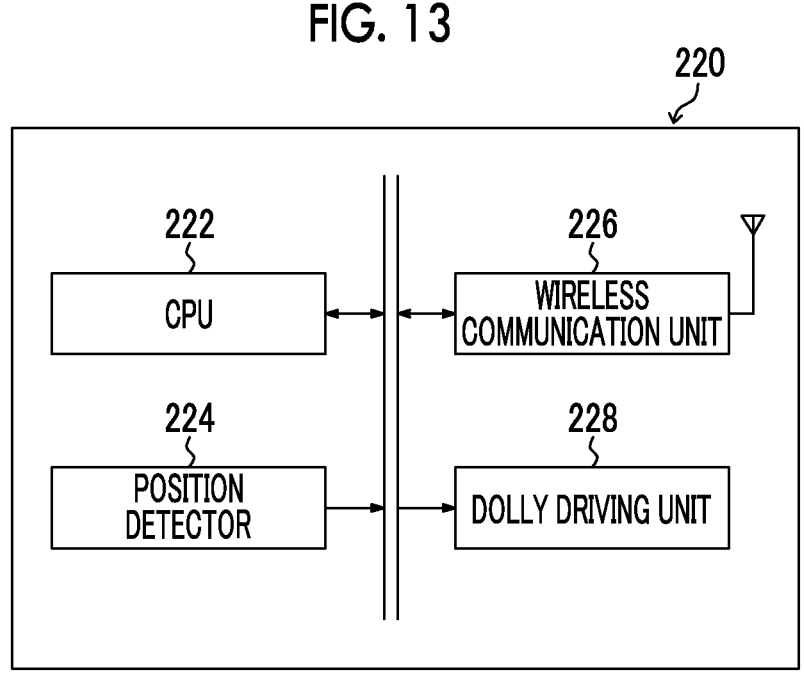
FIG. 13 is a block diagram illustrating an internal configuration of a dolly body.

As illustrated in FIG. 13, the dolly body 220 includes a central processing unit (CPU) 222, a position detector 224, a wireless communication unit 226, and a dolly driving unit 228.

The CPU 222 is a unit that generally controls the respective units of the dolly body 220, and the position detector 224 detects a position on the rail 210 of the dolly body 220.

The wireless communication unit 226 is a unit that performs wireless communication with the imaging device 10, and receives a position instruction for a moving target from the imaging device 10 or transmits information such as a current position of the dolly body 220 to the imaging device 10 through wireless communication.

The dolly driving unit 228 is driven by an instruction from the CPU 222 and moves the dolly body 220 to a target position that is received from the imaging device 10.

In a case in which the dolly device 200 is used at the time of time-lapse imaging, a start position and an end position of the dolly body 220 when the start image and the end image of time-lapse imaging are captured are set using the button 121b (FIG. 5) for operating the dolly device or the crane device of the smartphone 100.

If the dolly and crane control unit 45 of the imaging device 10 acquires the start position and the end position of the dolly body 220 set by the smartphone 100, the dolly and crane control unit 45 can calculate the amount of displacement between still images of the dolly body 220 by dividing the amount of movement of the dolly body 220 (end position-start position) by the number of captured images.

In a case in which the time-lapse imaging is performed using both of the pan and tilt mechanism 32 and the dolly device 200, the camerawork control unit 46 transmits a position instruction for moving the dolly body 220 to the dolly device 200 in synchronization with a timing of driving the pan and tilt mechanism 32.

Figure 14:
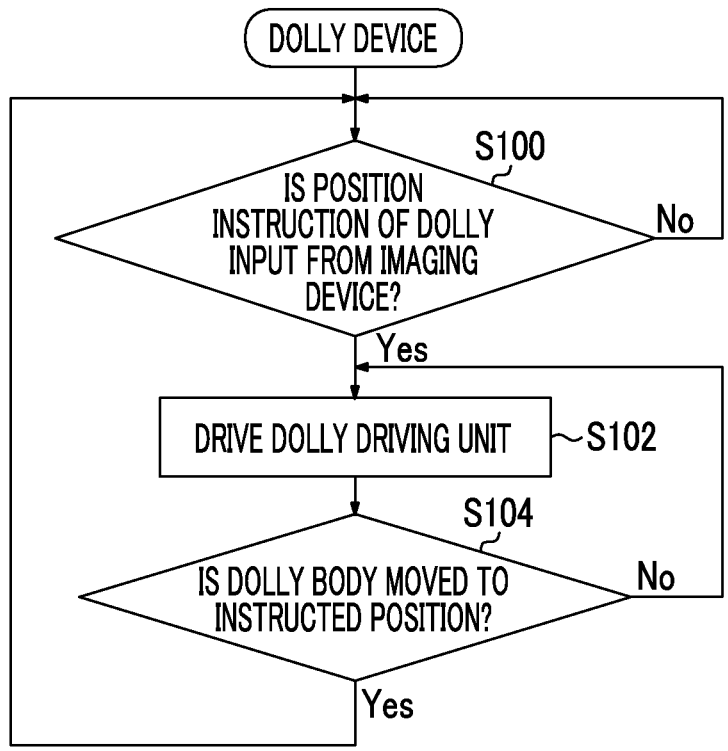
FIG. 14 is a flowchart illustrating operation content of the dolly device at the time of time-lapse imaging.

FIG. 14 is a flowchart illustrating operation content of the dolly device 200 at the time of time-lapse imaging.

The CPU 222 determines whether or not a position instruction indicating the target position of the dolly is input (or received) from the camerawork control unit 46 (or the dolly and crane control unit 45) (step S100). If the CPU 222 receives the position instruction, the CPU 222 outputs the received position instruction to the dolly driving unit 228. The dolly driving unit 228 moves the dolly body 220 based on the input position instruction (step S102).

Subsequently, the CPU 222 determines whether or not the dolly body 220 is moved to the instructed position based on a detection signal of the position detector 224. If the dolly body 220 is moved to a position of the target position, the process returns to step S100 and then reception of a position instruction is waited for.

By repeatedly performing the process of steps S100 to S104, the dolly body 220 (that is, the imaging device 10) is sequentially moved from the end position to the start position along the rail 210 each time the still image is captured.

Even in a case in which the imaging device 10 is mounted on the crane device, the control can be performed similarly to the dolly device 200.

[UI for Operation of Pan and Tilt Angles]

FIG. 15 is a diagram illustrating another UI when the pan and tilt mechanism is manually operated by the smartphone 100.

In FIG. 5, the pan and tilt mechanism 32 is manually moved in the pan direction and the tilt direction using the cross button including up, down, left, and right buttons, whereas the UI illustrated in FIG. 15 can output (transmit) a pan and tilt instruction for moving the pan and tilt mechanism 32 in the pan direction and the tilt direction by tapping the image display portion 121a in which the live view image is displayed.

That is, if any position (for example, a subject moved to a center of an angle of view) on the image display portion 121a is tapped as illustrated in portion (a) of FIG. 15, the UI in this example outputs a pan and tilt instruction for moving the pan and tilt mechanism 32 in the pan direction and the tilt direction so that the subject imaged in the tapped position comes to a center position of the image display portion 121a, as illustrated in portion (b) of FIG. 15.

Accordingly, when, for example, the start image and the end image are set, it is possible to operate the pan and tilt mechanism 32 simply and rapidly.

[Others]

While the two images including the start image and the end image are set and the time-lapse imaging from the start image to the end image is performed in this embodiment, one or a plurality of intermediate images may be set between the start image and the end image and the pan and tilt mechanism may be controlled so that the intermediate image is gone through.

Further, in a case in which the still image capturing mode or the video mode is selected (step S16 in FIG. 4), it is understood that the imaging device 10 can perform normal still image capturing or video imaging. Even in a case in which the normal still image capturing or video imaging is performed, the imaging device 10 can be remotely operated using the smartphone 100, which is particularly effective in a case in which self-imaging is performed.

Further, the present invention is not limited to the above-described embodiments, and it is understood that various modifications can be made without departing from the spirit of the present invention.

EXPLANATION OF REFERENCES

10: imaging device
20: imaging unit
22: imaging lens
24: imaging element
30: pan and tilt device
32: pan and tilt mechanism
34: pan driving unit
36: tilt driving unit
40: control unit
41: signal processing unit
42: imaging control unit
43: lens control unit
44: pan and tilt control unit
45: dolly and crane control unit
46: camerawork control unit
50, 110, 226: wireless communication unit
60: operation unit
61: display unit
62: memory
100: smartphone
120: display and input unit
200: dolly device
210: rail
220: dolly body

What is claimed is:

1. An imaging device, comprising:
an imaging unit including an imaging lens and an imaging element;
a pan and tilt mechanism that rotates the imaging unit in a horizontal direction and a vertical direction relative to a device body;
a wireless communication unit configured to:
  output a live-view image captured by the imaging unit to a display unit;
  receive an instruction input for operating the pan and tilt mechanism through a manual operation;
  receive an instruction input for specifying camerawork performed using the live-view image displayed on the display unit and the wireless communication unit, the instruction input for specifying camerawork specifying camerawork in time-lapse imaging in which a plurality of still images are captured at certain imaging intervals; and
  receive an instruction input for start of the time-lapse imaging;
a control unit that controls at least the pan and tilt mechanism and controls the imaging unit to perform the time-lapse imaging based on the instruction input for specifying the camerawork when the control unit receives the instruction input for specifying the camerawork and then receives the instruction input for start of the time-lapse imaging; and
angle-detection units, each of the angle-detection units including a sensor, that detect pan and tilt angles of the imaging unit, respectively,
wherein the wireless communication unit receives the pan and tilt angles detected by the angle-detection unit at a time of setting an imaging direction of each of the plurality of still images, as the instruction input for specifying the camerawork, when two or more images of the plurality of still images of which the respective imaging directions are different are set,
wherein the two or more images of the plurality of still images include a start image and an end image of the time-lapse imaging,
wherein the wireless communication unit receives a number of the plurality of still images or a playback time of the plurality of still images, and an imaging period of the time-lapse imaging as an additional instruction input for specifying the camerawork, and
wherein the control unit calculates an imaging interval of the plurality of still images and a change in pan and tilt angles between each of the plurality of still images based on respective pan and tilt angles of the start image and the end image of the time-lapse imaging, the number of the plurality of still images or the playback time of the plurality of still images, and the imaging period of the time-lapse imaging, and controls the pan and tilt mechanism and the imaging unit based on the imaging interval and the change in the pan and tilt angles between each of the plurality of still images.

2. The imaging device according to claim 1,
wherein the wireless communication unit receives an imaging interval of the time-lapse imaging as a further additional instruction input for specifying the camerawork, and
wherein the control unit calculates the change in the pan and tilt angles between each of the plurality of still images based on the respective pan and tilt angles of the start image and the end image of the time-lapse imaging, and the number of the plurality of still images or the playback time of the plurality of still images, and controls the pan and tilt mechanism and the imaging unit based on the imaging interval of the time-lapse imaging and the change in the pan and tilt angles between each of the plurality of still images.

3. The imaging device according to claim 1, further comprising:
a recording image generation unit that generates an image for recording obtained by connecting the plurality of still images.

4. The imaging device according to claim 3,
wherein the wireless communication unit wirelessly communicates with an external terminal, and
wherein the wireless communication unit transmits the image for recording generated by the recording image generation unit to the external terminal.

5. The imaging device according to claim 1, further comprising:
a recording image generation unit that generates an image for recording obtained by connecting a still images captured through the time-lapse imaging,
wherein the wireless communication unit receives a number of the still images or a playback time of the still images captured through the time-lapse imaging in one imaging direction and an imaging period of the time-lapse imaging as a further additional instruction input for specifying the camerawork,
wherein the control unit calculates an imaging interval of the plurality of still images based on the number of the still images or the playback time of the still images, and the imaging period of the time-lapse imaging, and controls the pan and tilt mechanism and the imaging unit based on pan and tilt angles of the two or more images of the plurality of still images of which the respective imaging directions are different, the number of the still images or the playback time of the still images, and the imaging interval, and
wherein the recording image generation unit connects still images in time series of which imaging directions are the same among the plurality of still images, and generates a plurality of images for recording of which imaging directions are different.

6. The imaging device according to claim 1,
wherein the imaging lens is a zoom lens,
wherein the wireless communication unit receives an instruction input for operating the zoom lens, and
wherein when the two or more images of the plurality of still images of which the imaging directions are different are set, the wireless communication unit receives a zoom magnification of the zoom lens at the time of setting the imaging direction of each image of the plurality of still images, as a further additional instruction input for specifying the camerawork.

7. The imaging device according to claim 1,
wherein the imaging device has a time-lapse imaging mode for performing the time-lapse imaging, a still-image capturing mode, and a video-imaging mode,
wherein the wireless communication unit receives a selection instruction for the time-lapse imaging mode, the still-image capturing mode, or the video-imaging mode, and an imaging instruction in the still-image capturing mode or the video-imaging mode from an external terminal, and
wherein the control unit performs switching to the still-image capturing mode or the video-imaging mode when the control unit receives the selection instruction for the still-image capturing mode or the-video imaging mode via the wireless communication unit, and controls the imaging unit to capture a still image or a video when the control unit receives the imaging instruction in the still-image capturing mode or the video-imaging mode.

8. The imaging device according to claim 1,
wherein the wireless communication unit is further configured to receive an instruction input for a preview display,
wherein the control unit controls at least the pan and tilt mechanism based on the instruction input for specifying the camerawork and displays a live-view image on the display unit when the control unit receives the instruction input for a preview display from the wireless communication unit.

9. The imaging device according to claim 1,
wherein the device body includes a tripod mounting unit.

10. A time-lapse imaging method in an imaging device comprising an imaging unit including an imaging lens and an imaging element, and a pan and tilt mechanism that rotates the imaging unit in a horizontal direction and a vertical direction relative to a device body, the time-lapse imaging method comprising the steps of:
displaying a live-view image captured by the imaging unit on a display unit;
receiving an instruction input for operating the pan and tilt mechanism through a manual operation;
receiving an instruction input for specifying camerawork performed using the live-view image displayed on the display unit and the wireless communication unit, the instruction input for specifying camerawork specifying camerawork in time-lapse imaging in which a plurality of still images are captured at certain imaging intervals;
receiving an instruction input for start of the time-lapse imaging;
controlling at least the pan and tilt mechanism and controlling the imaging unit to perform the time-lapse imaging based on the instruction input for specifying the camerawork when the instruction input for specifying the camerawork is received and then the instruction input for start of the time-lapse imaging is received;
detecting pan and tilt angles of the imaging unit, respectively;
receiving the pan and tilt angles at a time of setting an imaging direction of each image of the plurality of still images, as the instruction input for specifying the camerawork, when two or more images of the plurality of still images of which the respective imaging directions are different are set,
wherein the two or more images of the plurality of still images include a start image and an end image of the time-lapse imaging,
wherein the wireless communication unit receives a number of the plurality of still images or a playback time of the plurality of still images, and an imaging period of the time-lapse imaging as an additional instruction input for specifying the camerawork;
calculating an imaging interval of the plurality of still images and a change in pan and tilt angles between each of the plurality of still images based on respective pan and tilt angles of the start image and the end image of the time-lapse imaging, the number of the plurality of still images or the playback time of the plurality of still images, and the imaging period of the time-lapse imaging; and
controlling the pan and tilt mechanism and the imaging unit based on the imaging interval and the change in the pan and tilt angles between each of the plurality of still images.

11. An imaging device, comprising:
an imaging unit including an imaging lens and an imaging element;
a pan and tilt mechanism that rotates the imaging unit in a horizontal direction and a vertical direction relative to a device body;
a wireless communication unit configured to:
output a live-view image captured by the imaging unit to a display unit;
receive an instruction input for operating the pan and tilt mechanism through a manual operation;
receive an instruction input for specifying camerawork performed using the live-view image displayed on the display unit and the wireless communication unit, the instruction input for specifying camerawork specifying camerawork in time-lapse imaging in which a plurality of still images are captured at certain imaging intervals; and
receive an instruction input for start of the time-lapse imaging;
a control unit that controls at least the pan and tilt mechanism and controls the imaging unit to perform the time-lapse imaging based on the instruction input for specifying the camerawork when the control unit receives the instruction input for specifying the camerawork and then receives the instruction input for start of the time-lapse imaging; and
angle-detection units, each of the angle-detection units including a sensor, that detect pan and tilt angles of the imaging unit, respectively,
wherein the wireless communication unit receives the pan and tilt angles detected by the angle-detection unit at a time of setting an imaging direction of each of the plurality of still images, as the instruction input for specifying the camerawork, when two or more images of the plurality of still images of which the imaging directions are different are set, wherein the two or more images of the plurality of still images include a start image and an end image of the time-lapse imaging, wherein the wireless communication unit receives a number of the plurality of still images or a playback time of the plurality of still images, and an imaging interval of the time-lapse imaging as an additional instruction input for specifying the camerawork, and wherein the control unit calculates a change in pan and tilt angles between each of the plurality of still images based on respective pan and tilt angles of the start image and the end image of the time-lapse imaging and the number of the plurality of still images or the playback time of the plurality of still images, and controls the pan and tilt mechanism and the imaging unit based on the imaging interval of the time-lapse imaging and the change in the pan and tilt angles between each of the plurality of still images.

12. An imaging device, comprising:

an imaging unit including an imaging lens and an imaging element;

a pan and tilt mechanism that rotates the imaging unit in a horizontal direction and a vertical direction relative to a device body;

a wireless communication unit configured to:
  output a live-view image captured by the imaging unit to a display unit;
  receive an instruction input for operating the pan and tilt mechanism through a manual operation;
  receive an instruction input for specifying camerawork performed using the live-view image displayed on the display unit and the wireless communication unit, the instruction input for specifying camerawork specifying camerawork in time-lapse imaging in which a plurality of still images are captured at certain imaging intervals; and
  receive an instruction input for start of the time-lapse imaging;

a control unit that controls at least the pan and tilt mechanism and controls the imaging unit to perform the time-lapse imaging based on the instruction input for specifying the camerawork when the control unit receives the instruction input for specifying the camerawork and then receives the instruction input for start of the time-lapse imaging;

angle-detection units, each of the angle-detection units including a sensor, that detect pan and tilt angles of the imaging unit, respectively; and a recording image generation unit that generates an image for recording obtained by connecting still images captured through the time-lapse imaging, wherein the wireless communication unit receives the pan and tilt angles detected by the angle-detection unit at a time of setting an imaging direction of each of the plurality of still images, as the instruction input for specifying the camerawork, when two or more images of the plurality of still images of which the respective imaging directions are different are set, wherein the wireless communication unit receives a number of the still images or a playback time of the still images captured through the time-lapse imaging in one imaging direction and an imaging period of the time-lapse imaging as an additional instruction input for specifying the camerawork, wherein the control unit calculates an imaging interval of the plurality of still images based on the number of still images or the playback time of the still images, and the imaging period of the time-lapse imaging, and controls the pan and tilt mechanism and the imaging unit based on pan and tilt angles of the two or more images of the plurality of still images of which the respective imaging directions are different, the number of still images or the playback time of the still images, and the imaging interval, and wherein the recording image generation unit connects still images in time series of which imaging directions are the same among the plurality of still images, and generates a plurality of images for recording of which imaging directions are different.

* * * * *